United States Patent
Hayashita

(10) Patent No.: US 10,428,768 B2
(45) Date of Patent: Oct. 1, 2019

(54) CONTROL DEVICE OF INTERNAL COMBUSTION ENGINE

(71) Applicant: Toyota Jidosha Kabushiki Kaisha, Toyota-shi Aichi-ken (JP)

(72) Inventor: Go Hayashita, Chigasaki Kanagawa-ken (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 232 days.

(21) Appl. No.: 15/609,927

(22) Filed: May 31, 2017

(65) Prior Publication Data

US 2017/0356392 A1    Dec. 14, 2017

(30) Foreign Application Priority Data

Jun. 14, 2016   (JP) .................................. 2016-118384

(51) Int. Cl.
*F01N 11/00* (2006.01)
*F02D 13/02* (2006.01)
(Continued)

(52) U.S. Cl.
CPC ........... *F02M 25/0227* (2013.01); *F01N 9/00* (2013.01); *F01N 11/007* (2013.01);
(Continued)

(58) Field of Classification Search
CPC .............. F02M 25/0227; F02M 25/028; F02D 41/1494; F02D 13/0261; F01N 11/007;
(Continued)

(56) References Cited

U.S. PATENT DOCUMENTS 5,148,776 A * 9/1992 Connor ................... F02B 47/02
123/25 A
6,071,476 A * 6/2000 Young .................... G01N 25/30
422/51
(Continued)

FOREIGN PATENT DOCUMENTS

JP    H2-180060 A    7/1990
JP    H0218060 A    7/1990
(Continued)

*Primary Examiner* — Jacob M Amick
*Assistant Examiner* — Charles Brauch
(74) *Attorney, Agent, or Firm* — Dinsmore & Shohl LLP

(57) ABSTRACT

A control device of an internal combustion engine comprises a heater control part configured to set a target temperature of the electrochemical cell and control the heater so that a temperature of the electrochemical cell becomes the target temperature. The heater control part sets the target temperature to a first temperature when water injection by the water injection device is not being demanded after a predetermined time elapses from startup of the internal combustion engine, and sets the target temperature to a second temperature when an operating state of the internal combustion engine is in a water outflow state where water injected by the water injection device reaches the exhaust passage without going through combustion of air-fuel mixture in the combustion chamber. The second temperature is higher than the first temperature.

18 Claims, 18 Drawing Sheets

(51) Int. Cl.
  *F02M 25/028* (2006.01)
  *F01N 9/00* (2006.01)
  *F02D 41/14* (2006.01)
  *F02M 25/022* (2006.01)

(52) U.S. Cl.
  CPC ..... *F02D 13/0261* (2013.01); *F02D 41/1494* (2013.01); *F02M 25/028* (2013.01); *F01N 2560/025* (2013.01); *F01N 2560/12* (2013.01); *F01N 2560/20* (2013.01); *F01N 2900/08* (2013.01); *F01N 2900/1404* (2013.01); *Y02T 10/18* (2013.01); *Y02T 10/47* (2013.01)

(58) Field of Classification Search
  CPC .. F01N 9/00; F01N 2900/08; F01N 2560/025; F01N 2900/1404; F01N 2560/12; F01N 2560/20; Y02T 10/47; Y02T 10/18
  See application file for complete search history.

(56) References Cited

U.S. PATENT DOCUMENTS

| 2009/0116534 | A1 | 5/2009 | Tabery et al. |
| 2012/0211362 | A1* | 8/2012 | Onkawa ............ G01N 27/4077 204/424 |
| 2013/0006499 | A1* | 1/2013 | Date ..................... F02D 41/042 701/104 |

FOREIGN PATENT DOCUMENTS

| JP | 4078808 B2 * | 4/2008 | |
| JP | 2008-138561 A | 6/2008 | |
| JP | 2008-232961 A | 10/2008 | |
| JP | 2009-529691 A | 8/2009 | |
| JP | 2010-071110 A | 4/2010 | |
| JP | 2011-149927 A | 8/2011 | |
| WO | WO-2010036097 A1 * | 4/2010 | ............... F01N 3/10 |

\* cited by examiner

FIG. 1
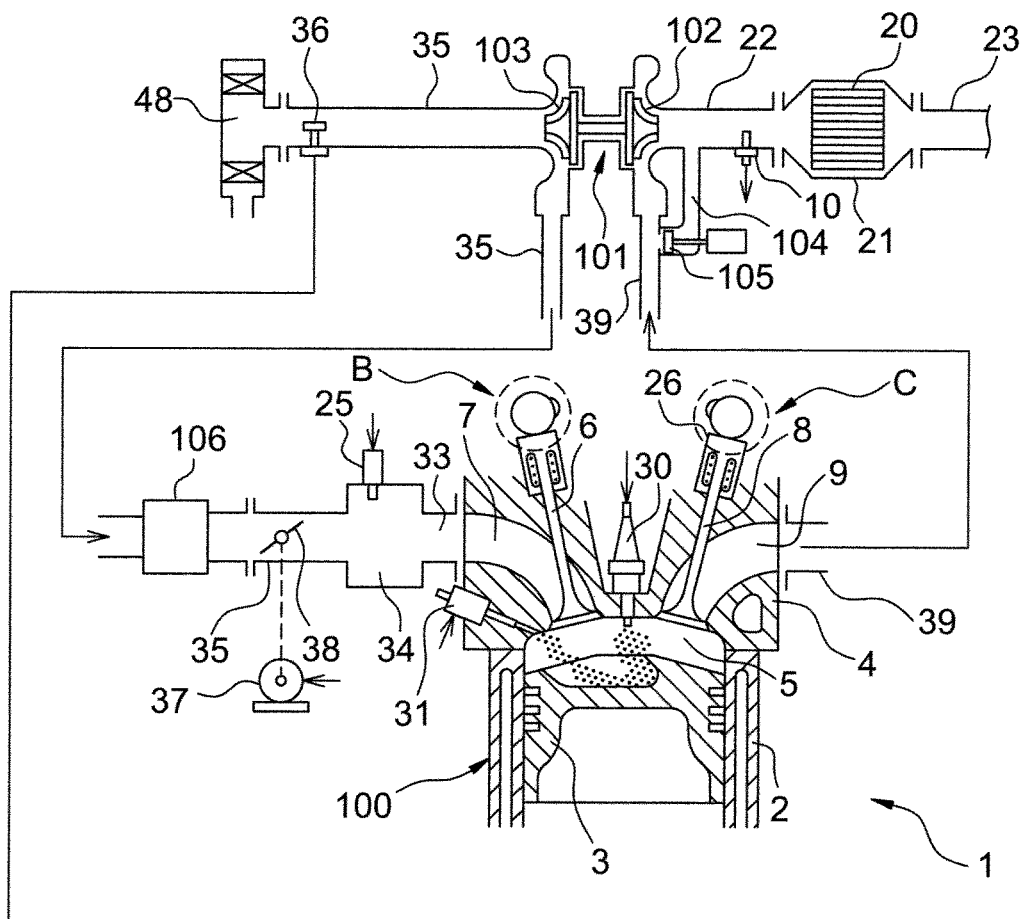
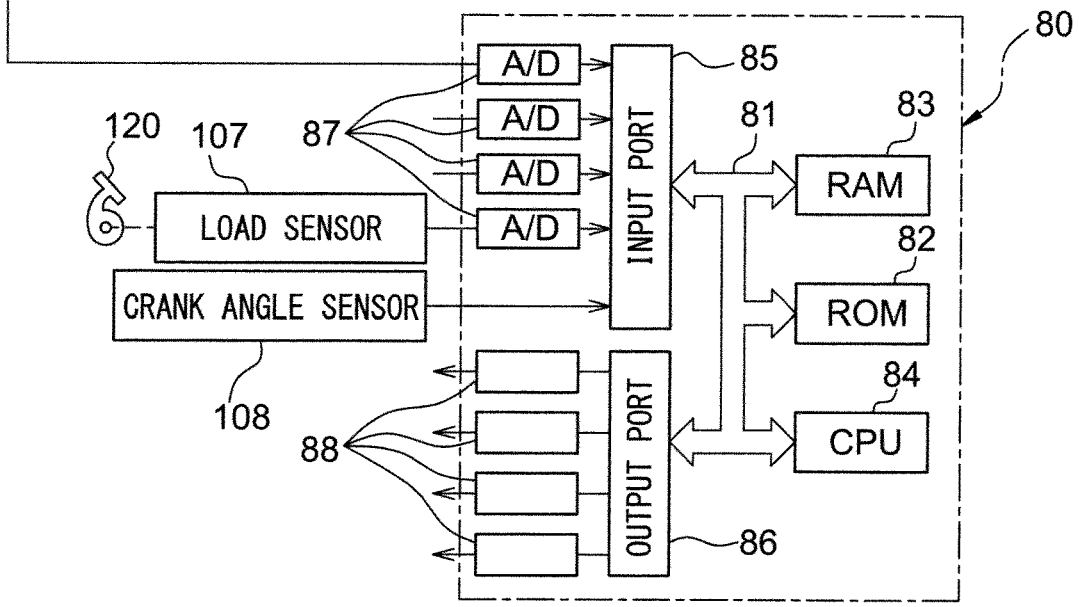

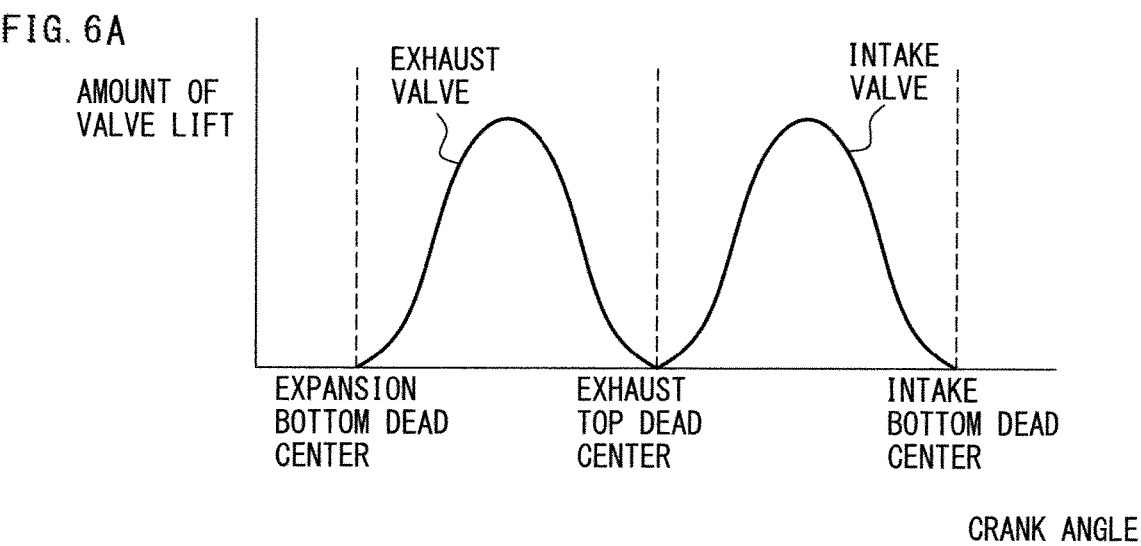
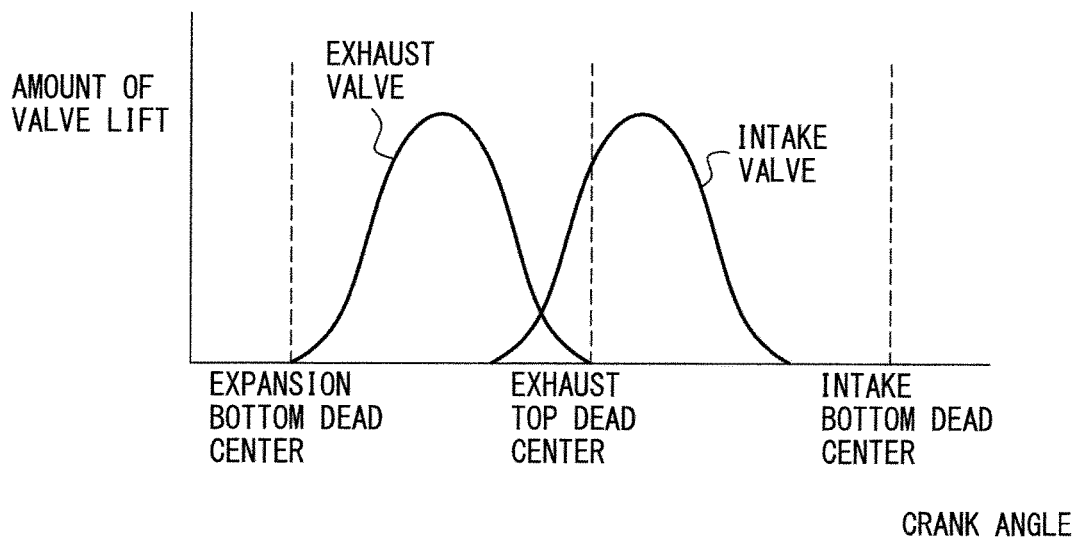

CONTROL DEVICE OF INTERNAL COMBUSTION ENGINE

CROSS-REFERENCE TO RELATED APPLICATION

This application claims priority to Japanese Patent Application No. 2016-118384 filed on Jun. 14, 2016, the entire contents of which are hereby incorporated by reference.

TECHNICAL FIELD

The present disclosure relates to a control device of an internal combustion engine.

BACKGROUND ART

It has been known in the past to arrange an exhaust sensor in an exhaust passage of an internal combustion engine to detect a specific component in the exhaust gas (for example, see PLT 1). Such an exhaust sensor is provided with an element body provided with an electrochemical cell, and a protective layer formed on the outer surface of the element body and comprised of a porous ceramic. The exhaust sensor is fastened to an exhaust pipe so as to be exposed to exhaust gas. Part of the exhaust gas passes through the protective layer and flows to the inside of the element body. Further, the exhaust sensor is provided with a heater for heating the element body so that the electrochemical cell becomes a predetermined operating temperature or more.

In this regard, when the temperature of the exhaust pipe is the dew point temperature of water or less, the water vapor in the exhaust gas condenses and condensed water is generated. If there is condensed water in the exhaust passage, drops of the condensed water strike the protective layer of the exhaust sensor together with the exhaust gas. If the protective layer does not have water repellency, the drops of water striking the protective layer will penetrate to the inside of the protective layer. If the temperature of the protective layer is high due to heating by the heater, the drops of water penetrating the protective layer will evaporate inside the protective layer. As a result, thermal shock will be given to the protective layer and element body and the element will sometimes crack.

Therefore, PLT 1 describes preventing cracking of the element of the exhaust sensor by utilizing the Leidenfrost phenomenon to give the protective layer of the exhaust sensor water repellency. The "Leidenfrost phenomenon" is the phenomenon where when drops of water strike a high temperature protective layer, a film of water vapor is formed between the protective layer and drops of water whereby transfer of heat between the protective layer and the drops of water is suppressed. If the Leidenfrost phenomenon occurs, the drops of water are repelled from the protective layer, so water is kept from penetrating the protective layer.

In PLT 1, at the time of startup of the internal combustion engine, to use the Leidenfrost phenomenon to prevent cracking of the element, the temperature of the sensor surface is held at a shock resistance temperature higher than the operating temperature until the temperature around the exhaust sensor reaches the dew point temperature. After that, if the temperature around the exhaust sensor reaches the dew point temperature, the temperature of the sensor surface is made to fall from the shock resistance temperature to the operating temperature.

It is also known to provide an internal combustion engine with a water injection device injecting water into an intake passage (for example, see PLT 2). For example, when the engine load is high, the water injection device injects water into the intake passage in order to lower the temperature of the air-fuel mixture and suppress the occurrence of knocking.

CITATION LIST

Patent Literature

PLT 1. Japanese Patent Publication No. 2009-529691A
PLT 2. Japanese Patent Publication No. 2008-138561A

SUMMARY

Solution to Problem

However, if water is injected inside the intake passage when valve overlap occurs between the intake valve and exhaust valve, the injected water reaches the exhaust passage without going through combustion of the air-fuel mixture in the combustion chamber. As a result, even after the ambient temperature of the exhaust sensor reaches the dew point temperature, a large amount of drops of water are liable to strike the protective layer. For this reason, in the control described in PLT 1, after the temperature of the sensor surface is decreased to the operating temperature, due to the water injected by the water injection device, the element of the exhaust sensor is liable to crack. On the other hand, maintaining the sensor element at a high temperature over a long period of time after startup of the internal combustion engine to reliably prevent the element of the exhaust sensor from cracking by the Leidenfrost phenomenon causes the power consumption of the heater to remarkably increase.

Therefore, an object of the present disclosure is to suppress the increase in power consumption of the heater of an exhaust sensor while preventing water coverage from causing the element of the exhaust sensor to crack, in an internal combustion engine provided with a water injection device and exhaust sensor.

Solution to Problem

In order to solve the above problem, in a first aspect, there is provided a control device of an internal combustion engine controlling an internal combustion engine comprising an exhaust sensor arranged in an exhaust passage and detecting a specific component in exhaust gas, and a water injection device injecting water inside an intake passage or inside a combustion chamber, wherein the exhaust sensor comprises an element body provided with an electrochemical cell, a protective layer formed on an outer surface of the element body and comprised of a porous ceramic, and a heater heating the element body and the protective layer, the control device comprises a heater control part configured to set a target temperature of the electrochemical cell and control the heater so that a temperature of the electrochemical cell becomes the target temperature and the heater control part is configured to set the target temperature to a first temperature when water injection by the water injection device is not being demanded after a predetermined time elapses from startup of the internal combustion engine, and set the target temperature to a second temperature when an operating state of the internal combustion engine is in a water outflow state where water injected by the water injection device reaches the exhaust passage without going through combustion of air-fuel mixture in the combustion chamber, the second temperature being higher than the first temperature.

In a second aspect, the internal combustion engine comprises a variable valve timing mechanism able to change an amount of valve overlap between an intake valve and an exhaust valve, the water injection device injects water into the intake passage, and the time when the operating state of the internal combustion engine is in the water outflow state is the time when water is being injected by the water injection device and the amount of valve overlap is larger than a predetermined value which is zero or more, in the first aspect.

In a third aspect, the water injection device injects water into the combustion chamber, and the time when the operating state of the internal combustion engine is in the water outflow state is the time when water is being injected by the water injection device while the exhaust valve is opened, in the first aspect.

In a forth aspect, the control device further comprises a water estimating part configured to estimate an amount of water injected by the water injection device and reaching the exhaust passage without going through combustion of the air-fuel mixture in the combustion chamber, and the heater control part is configured to set the second temperature higher when the amount of water estimated by the water estimating part is relatively large compared to when the amount of water estimated by the water estimating part is relatively small, in any one of the first to third aspects.

In a fifth aspect, the heater control part is configured to set the target temperature to the second temperature when water is being injected by the water injection device, in any one of the first to fourth aspects.

In a sixth aspect, the control device further comprises a water injection device control part configured to control the water injection device, the heater control part is configured to set the target temperature to the second temperature when injection of water by the water injection device is demanded, and the water injection device control part is configured to start injection of water by the water injection device after an estimated temperature of the electrochemical cell reaches the second temperature, in the fifth aspect.

Advantageous Effects of Present Disclosure

According to the present disclosure, in an internal combustion engine provided with a water injection device and exhaust sensor, it is possible to suppress the increase in power consumption of the heater of the exhaust sensor while preventing water coverage from causing the element of the exhaust sensor to crack.

BRIEF DESCRIPTION OF DRAWINGS

FIG. 1 is a view schematically showing an internal combustion engine to which a control device of an exhaust sensor according to a first embodiment of the present disclosure is applied.

FIG. 6A is a view schematically showing an opening timing of an exhaust valve and intake valve.

FIG. 6B is a view schematically showing an opening timing of an exhaust valve and intake valve.

DESCRIPTION OF EMBODIMENTS

Figure 2:
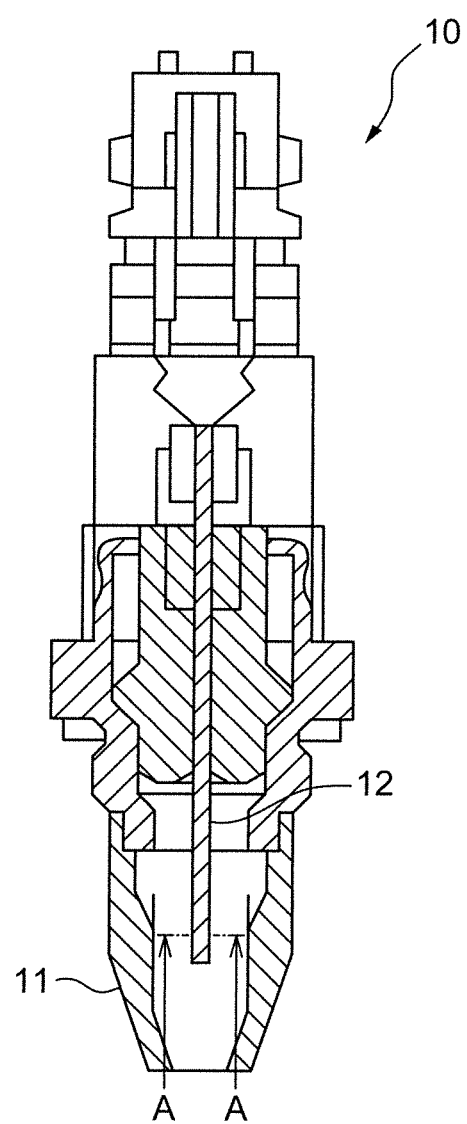
FIG. 2 is an enlarged view of an air-fuel ratio sensor.

Below, referring to the drawings, embodiments of the present disclosure will be explained in detail. Note that, in the following explanation, similar component elements are assigned the same reference notations.

<First Embodiment>

First, referring to FIG. 1 to FIG. 8, a first embodiment of the present disclosure will be explained.

<Explanation of Internal Combustion Engine as a Whole>

FIG. 1 is a schematic view of an internal combustion engine to which a control device of an internal combustion engine according to a first embodiment of the present disclosure is applied. In the present embodiment, the internal combustion engine 1 is a spark ignition type internal combustion engine. The internal combustion engine 1 is for example mounted in a vehicle.

The internal combustion engine 1 is provided with an engine body 100 including a cylinder block 2 and a cylinder head 4. Inside the cylinder block 2, pistons 3 moving back and forth inside the cylinder block 2 are arranged. Combustion chambers 5 are formed between the pistons 3 and the cylinder head 4. Intake ports 7 and exhaust ports 9 are formed at the cylinder head 4. The intake ports 7 and exhaust ports 9 are connected to the combustion chambers 5. The intake valves 6 are arranged at the end parts of the intake ports 7 and are formed to be able to open and close the intake ports 7. The exhaust valves 8 are arranged at the end parts of the exhaust ports 9 and are formed to be able to open and close the exhaust ports 9. Further, the internal combustion engine 1 is provided with a variable valve timing mechanism B able to control the opening timing and closing timing of the intake valves 6 and a variable valve timing mechanism C able to control the opening timing and closing timing of the exhaust valves 8.

The internal combustion engine 1 is provided with fuel injectors 31 for supplying fuel to the combustion chambers 5 and spark plugs 30 for igniting the air-fuel mixture inside the combustion chambers 5. The spark plugs 30 are fastened to the cylinder head 4. The fuel injectors 31 are arranged at the peripheral parts of the inside wall of the cylinder head 4 so as to directly inject fuel into the combustion chambers 5. That is, the internal combustion engine 1 is a cylinder injection type internal combustion engine. Further, the internal combustion engine 1 uses gasoline with a stoichiometric air-fuel ratio of 14.6 as fuel. However, in the internal combustion engine 1, other fuel may be used.

The internal combustion engine 1 is provided with a supercharger comprised of a turbocharger 101. The turbocharger 101 includes a turbine 102 arranged in the exhaust passage, a compressor 103 arranged in the intake passage, and a shaft connecting the turbine 102 and the compressor 103. If the turbine 102 turns along with flow of exhaust, the compressor 103 also turns and the pressure of the intake air is raised. Therefore, the turbocharger 101 can utilize the energy of the exhaust gas to compress the intake air and increase the amount of intake air.

The intake ports 7 are respectively connected to a surge tank 34 through corresponding intake runners 33. The surge tank 34 is connected through an intake pipe 35 to an outlet part of a compressor 103 of the turbocharger 101. At the inside of the intake pipe 35 connecting the surge tank 34 and the compressor 103, a throttle valve 38 driven by a throttle valve drive actuator 37 is arranged. The throttle valve 38 can be turned by the throttle valve drive actuator 37 to change the opening area of the intake passage. Further, in the intake pipe 35 between the compressor 103 and the throttle valve 38, a cooler (intercooler) 106 is arranged for cooling the intake air compressed by the turbocharger 101.

The inlet part of the compressor 103 is connected through the intake pipe 35 to an air cleaner 48. Inside of the intake pipe 35 between the air cleaner 48 and compressor 103, an air flow meter 36 is arranged for detecting the amount of intake air. The intake port 7, intake runners 33, surge tank 34, intake pipe 35, etc. form an intake passage for introducing air to the combustion chambers 5.

On the other hand, the exhaust ports 9 of the cylinders are connected to the exhaust manifold 39. The exhaust manifold 39 has a plurality of tubes connected to the exhaust ports 9 and a collector at which these tubes converge. The collector of the exhaust manifold 39 is connected to the inlet part of the turbine 102 of the turbocharger 101. The outlet part of the turbine 102 is connected through the exhaust pipe 22 to the casing 21. The casing 21 houses an exhaust purification catalyst 20. The casing 21 is connected to the exhaust pipe 23. The exhaust port 9, exhaust manifold 39, exhaust pipes 22, 23, etc. form an exhaust passage discharging exhaust gas produced by combustion of the air-fuel mixture from the combustion chambers 5.

Between the exhaust manifold 39 upstream of the turbine 102 and the exhaust pipe 22 downstream of the turbine 102, a bypass passage 104 is arranged for bypassing the turbine 102. At the bypass passage 104, a waist gate valve 105 which is a bypass valve for opening and closing the bypass passage 104 is arranged. By adjusting the opening degree of the waist gate valve 105, it is possible to adjust the amount of exhaust gas passing through the turbine 102. Therefore, it is possible to control the waist gate valve 105 to thereby control the pressure of the intake air (supercharging pressure).

Further, the internal combustion engine 1 is further provided with a water injection device 25 injecting water inside the intake passage. In the present embodiment, the water injection device 25 is arranged in the surge tank 34 inside the intake passage and injects water to the inside of the surge tank 34. Note that, the water injection device 25 may be arranged at another position of the intake passage.

The internal combustion engine 1 is provided with an electronic control unit (ECU) 80 comprised of a digital computer. The ECU 80 includes components connected with each other through a bidirectional bus 81 such as a RAM (random access memory) 83, ROM (read only memory) 82, CPU (microprocessor) 84, input port 85, and output port 86.

The output signal of the air flow meter 36 is input through a corresponding AD converter 87 to the input port 85. The internal combustion engine 1 is provided with an accelerator pedal 120. The accelerator pedal 120 has a load sensor 107 connected with it. The load sensor 107 generates an output voltage proportional to the amount of depression of the accelerator pedal 120. The output voltage of the load sensor 107 is input through a corresponding AD converter 87 to the input port 85.

The internal combustion engine 1 is provided with a crank angle sensor 108. The crank angle sensor 108 generates an output pulse every time the crankshaft rotates by for example a predetermined angle. This output pulse is input to the input port 85. At the CPU 84, the engine speed is calculated from the output pulse of the crank angle sensor 108. Further, it is possible to detect the crank angle from the output of the crank angle sensor 108.

The output port 86 of the ECU 80 is connected through the corresponding drive circuits 88 to the spark plugs 30, fuel injectors 31, throttle valve drive actuator 37, waist gate valve 105, water injection device 25, and variable valve timing mechanisms B and C. The ECU 80 can control the ignition timings of the spark plugs 30, the fuel injection timings and fuel injection amounts of the fuel injectors 31, the opening degrees of the throttle valves 38, the opening degree of the waist gate valve 105, the water injection timing and water injection amount of the water injection device 25, the opening timings and closing timings of the intake valves 6, and the opening timings and closing timings of the exhaust valves 8.

Note that, specific configurations of the internal combustion engine 1 such as the cylinder array, configuration of the intake/exhaust system, presence of a supercharger, etc., may differ from the configuration shown in FIG. 1. For example, the internal combustion engine may be a port injection type internal combustion engine. In this case, the fuel injectors 31 are arranged so as to inject fuel inside the intake ports 7. Further, the internal combustion engine 1 may be a compression ignition type internal combustion engine (diesel engine).

<Explanation of Air-Fuel Ratio Sensor>

In the present embodiment, as the exhaust sensor controlled by the control device of an exhaust sensor, an air-fuel ratio sensor 10 is arranged at the exhaust passage of the internal combustion engine 1. The air-fuel ratio sensor 10 detects a specific component in the exhaust gas flowing through the exhaust passage of the internal combustion engine 1. Specifically, the air-fuel ratio sensor 10 detects the concentration of oxygen in the exhaust gas to thereby linearly detect the air-fuel ratio of the exhaust gas.

In the present embodiment, the air-fuel ratio sensor 10 is arranged in the exhaust passage at the upstream side of the exhaust purification catalyst 20 in the direction of flow of exhaust gas. Note that, the air-fuel ratio sensor 10 may be arranged at another position in the exhaust passage, for example, at the downstream side of the exhaust purification catalyst 20 in the direction of flow of exhaust gas.

Below, referring to FIG. 2 and FIG. 3, the configuration of the air-fuel ratio sensor 10 will be explained. FIG. 2 is an enlarged view of the air-fuel ratio sensor 10. In FIG. 2, the front end side of the air-fuel ratio sensor 10 is shown by a cross-sectional view. The air-fuel ratio sensor 10 is fastened to the exhaust pipe 22 in the state with the front end part 11 inserted into the exhaust pipe 22. The air-fuel ratio sensor 10 is provided with a sensor element 12 having a plate-like shape at its inside.

Figure 3:
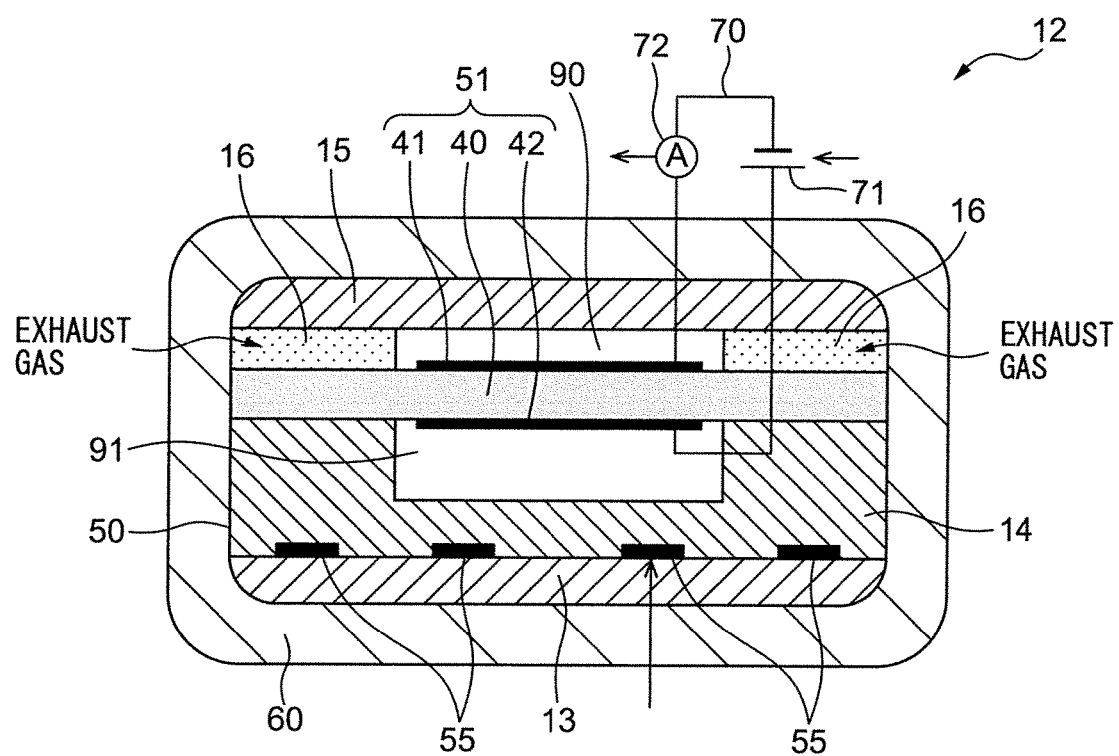
FIG. 3 is a cross-sectional view of a sensor element of an air-fuel ratio sensor along the line A-A of FIG. 2.

FIG. 3 is a cross-sectional view of a sensor element 12 of the air-fuel ratio sensor 10 along the line A-A of FIG. 2. As shown in FIG. 3, the sensor element 12 of the air-fuel ratio sensor 10 is provided with an element body 50 provided with a sensor cell 51 and a protective layer 60 formed on the outer surface of the element body 50.

The element body 50 is provided with a measured gas chamber 90 and a reference gas chamber 91. When the air-fuel ratio sensor 10 is arranged in the exhaust passage of the internal combustion engine 1, exhaust gas flowing through the exhaust passage is introduced into the measured gas chamber 90 as the measured gas. Reference gas is introduced into the reference gas chamber 91. The reference gas is for example the atmosphere. In this case, the reference gas chamber 91 is opened to the atmosphere.

The air-fuel ratio sensor 10 is a laminate type air-fuel ratio sensor comprised of a plurality of layers laminated together. The element body 50 is provided with a solid electrolyte layer 40, diffusion regulating layer 16, first barrier layer 13, second barrier layer 14, and third barrier layer 15. The solid electrolyte layer 40 is a thin plate member having oxide ion conductivity. The solid electrolyte layer 40 is, for example, a sintered body of $ZrO_2$ (zirconia), $HfO_2$, $ThO_2$, $Bi_2O_3$, etc. to which CaO, MgO, $Y_2O_3$, $Yb_2O_3$, etc. is added as a stabilizer. The diffusion regulating layer 16 is a thin plate member having gas permeability. The diffusion regulating layer 16 is, for example, comprised of alumina, magnesia, silica, spinel, mullite, or other porous ceramic. The barrier layers 13 to 15 are gas barrier type thin sheet members, and, for example, include alumina.

The layers of the element body 50 are comprised of, from the bottom of FIG. 3, the first barrier layer 13, second barrier layer 14, solid electrolyte layer 40, diffusion regulating layer 16, and third barrier layer 15 stacked in that order. The measured gas chamber 90 is formed and defined by the solid electrolyte layer 40, diffusion regulating layer 16, and third barrier layer 15. The exhaust gas passes through the protective layer 60 and diffusion regulating layer 16 and is introduced to the inside of the measured gas chamber 90. The diffusion regulating layer 16 regulates the diffusion of the measured gas. Note that, the measured gas chamber 90 may be configured in any form so long as adjoining the solid electrolyte layer 40 and having the measured gas introduced into it.

The reference gas chamber 91 is formed and defined by the solid electrolyte layer 40 and the second barrier layer 14. Note that, the reference gas chamber 91 may be configured in any form so long as adjoining the solid electrolyte layer 40 and having the reference gas flow into it.

The sensor cell 51 is an electrochemical cell having a solid electrolyte layer 40, first electrode 41, and second electrode 42. The first electrode 41 is arranged on the surface of the solid electrolyte layer 40 on the measured gas chamber 90 side so that it is exposed to the measured gas of the measured gas chamber 90. On the other hand, the second electrode 42 is arranged on the surface of the solid electrolyte layer 40 on the reference gas chamber 91 side so that it is exposed to the reference gas inside the reference gas chamber 91. The first electrode 41 and the second electrode 42 are arranged so as to face each other across the solid electrolyte layer 40. The first electrode 41 and second electrode 42 are comprised of platinum (Pt) or another precious metal with a high catalytic activity. For example, the first electrode 41 and second electrode 42 are porous cermet electrodes including mainly Pt.

The protective layer 60 is formed on the outer surface of the element body 50 so as to cover the entire outer surface of the element body 50. The protective layer 60 has a gas permeability and is comprised of alumina, titania, zirconia, silicon carbide, silicon nitride, zinc oxide, and other porous ceramic.

The sensor element 12 is further provided with a heater 55. In the present embodiment, the heater 55, as shown in FIG. 3, is arranged between the first barrier layer 13 and the second barrier layer 14. The heater 55 is, for example, a thin plate member of cermet including platinum (Pt) and ceramic (for example, alumina etc.) and forms a heat generating element generating heat by conduction of current. The heater 55 heats the element body 50 and protective layer 60.

The first electrode 41 and second electrode 42 of the sensor cell 51 are connected to an electrical circuit 70. The electrical circuit 70 is provided with a power supply 71 and current detector 72. The power supply 71 applies voltage across the electrodes so that the potential of the second electrode 42 becomes higher than the potential of the first electrode 41. The output port 86 of the ECU 80 is connected through a corresponding drive circuit 88 to the power supply 71. Therefore, the ECU 80 can control the power supply 71 and control the voltage applied to the sensor cell 51. Further, the current detector 72 detects the current flowing through the sensor cell 51 as the output of the sensor cell 51. The output of the current detector 72 is input through the corresponding AD converter 87 to the input port 85 of the ECU 80. Therefore, the ECU 80 can acquire the output of the sensor cell 51 detected by the current detector 72 from the current detector 72.

The air-fuel ratio sensor 10 detects the limit current flowing through the sensor cell 51 when applying predetermined voltage to the sensor cell 51 so as to detect the air-fuel ratio of the exhaust gas. Therefore, the air-fuel ratio sensor 10 in the present embodiment is a so-called limit current type air-fuel ratio sensor.

<Leidenfrost Phenomenon>

In this regard, when the temperature of the exhaust pipe 22 is the dew point temperature of water or less, the water vapor in the exhaust gas condenses and condensed water is formed. If there is condensed water in the exhaust passage, the drops of the condensed water strike the protective layer 60 of the air-fuel ratio sensor 10 together with the exhaust gas. When the protective layer 60 does not have water repellency, the drops of water striking the protective layer 60 penetrate to the inside of the protective layer 60. When due to heating by the heater 55, the temperature of the protective layer 60 is high, the drops of water penetrating to the protective layer 60 evaporate inside the protective layer 60. As a result, the protective layer 60 and element body 50 are given thermal shock and the sensor element 12 sometimes cracks.

The protective layer 60 has water repellency when the temperature is high. This property is obtained by causing the Leidenfrost phenomenon. The "Leidenfrost phenomenon" is the phenomenon where when drops of water strike a high temperature protective layer 60, a film of water vapor is formed between the protective layer 60 and drops of water whereby transfer of heat between the protective layer 60 and the drops of water is suppressed. If the Leidenfrost phenomenon occurs, the drops of water are repelled from the protective layer 60, so water is kept from penetrating the protective layer 60.

The temperature at which the Leidenfrost phenomenon occurs is generally said to be determined by the type of liquid which strikes an object. However, the inventors of the present application newly discovered that in an object with a low heat capacity such as the protective layer 60 of the air-fuel ratio sensor 10, the temperature at which the Leidenfrost phenomenon occurs changes in accordance with the amount of liquid.

Figure 4:
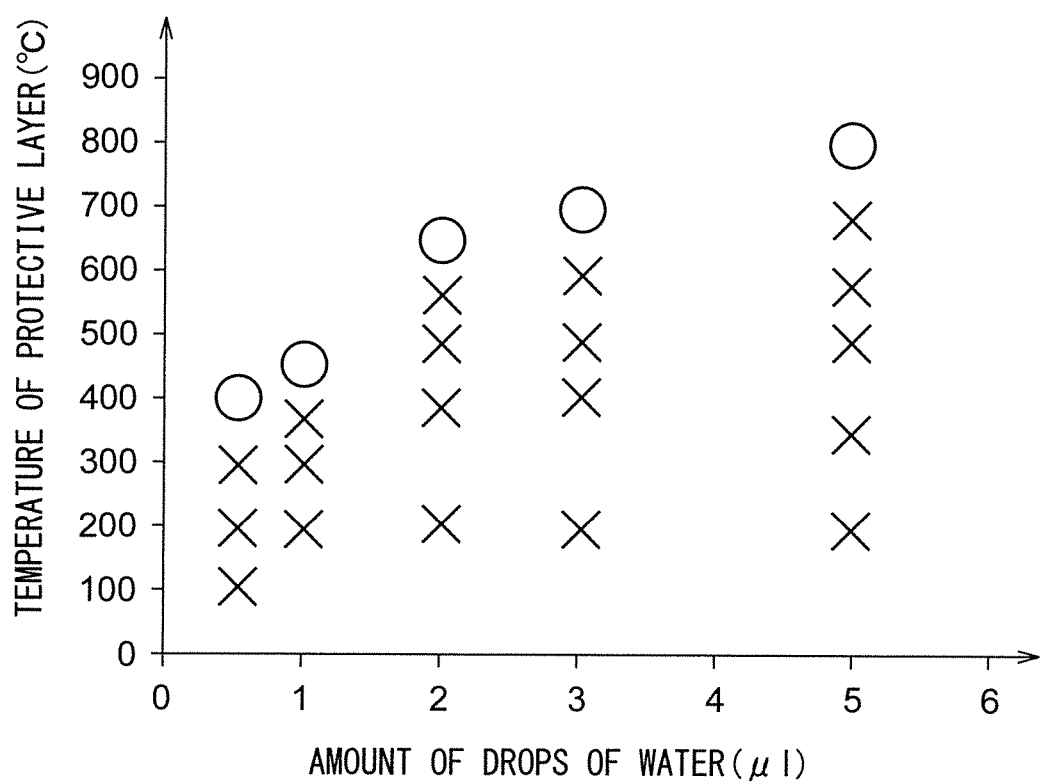
FIG. 4 is a graph showing a region where the Leidenfrost phenomenon occurs when changing an amount of drops of water striking a protective layer and temperature of a protective layer.

FIG. 4 is a graph showing the occurrence of the Leidenfrost phenomenon when the amount of drops of water striking the protective layer 60 and the temperature of the protective layer 60 change. The X marks in the figure show when no Leidenfrost phenomenon occurs. On the other hand, the O marks in the figure show when the Leidenfrost phenomenon occurs. As will be understood from FIG. 4, the temperature at which the Leidenfrost phenomenon occurs changes according to the amount of drops of water. Specifically, the temperature at which the Leidenfrost phenomenon occurs becomes higher the greater the amount of drops of water. The reason is believed to that in the protective layer 60 having a small heat capacity, the temperature of the protective layer 60 falls at the time of formation of the film of water vapor and the amount of fall of the temperature of the protective layer 60 is proportional to the amount of drops of water.

<Explanation of Control Device of Exhaust Sensor>

Figure 5:
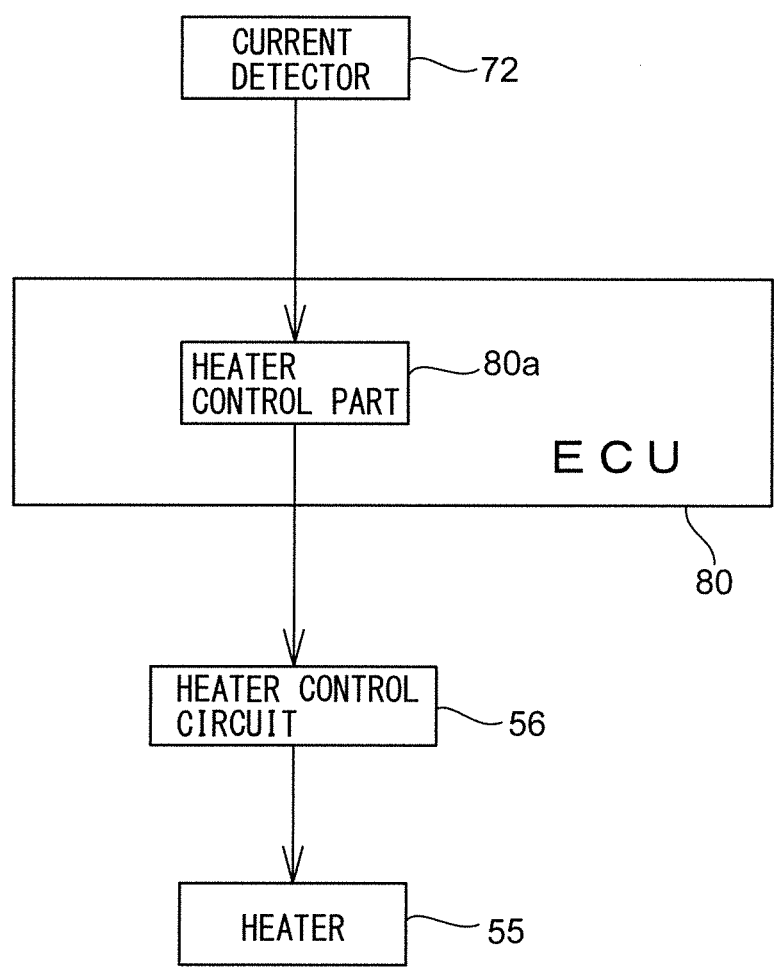
FIG. 5 is a block diagram schematically showing the configuration of a control device of an internal combustion engine according to the first embodiment of the present disclosure.

Below, a control device of an internal combustion engine 1 according to the present embodiment will be explained. FIG. 5 is a block diagram schematically showing the configuration of a control device of an internal combustion engine 1 according to the first embodiment of the present disclosure. The control device of an internal combustion engine 1 is provided with a heater control part 80a. In the present embodiment, the heater control part 80a is part of the ECU 80.

The heater control part 80a sets a target temperature of the sensor cell 51 and controls the heater 44 so that the temperature of the sensor cell 51 becomes the target temperature. The heater control part 80a controls the heater 55 through the heater control circuit 56. Specifically, the heater control part 80a calculates the temperature of the sensor cell 51 based on the impedance of the sensor cell 51, and performs feedback control of the power supplied to the heater 55 through the heater control circuit 56 so that the calculated temperature becomes the target temperature. Note that, the impedance of the sensor cell 51 is calculated from the output of the sensor cell 51 detected by the current detector 72 when high frequency voltage is supplied from the power supply 71 to the sensor cell 51.

When the sensor cell 51 is heated by the heater 55, the protective layer 60 is similarly heated by the heater 55. For this reason, the temperature of the protective layer 60 is correlated with the temperature of the sensor cell 51. Therefore, due to the above-mentioned feedback control, the heater control part 80a can control not only the temperature of the sensor cell 51, but also the temperature of the protective layer 60.

The heater control part 80a sets the target temperature of the sensor cell 51 as follows after a predetermined time elapses from startup of the internal combustion engine 1. The predetermined time is, for example, the time period required for the temperature of the exhaust pipe 22 to reach the dew point temperature of water due to warmup after the startup of the internal combustion engine 1.

In the present embodiment, for example, water injection by the water injection device 25 is demanded when the engine load of the internal combustion engine 1 becomes a predetermined value or more. When water injection is demanded, water is injected by the water injection device 25 into the intake passage. In other words, when water injection is not being demanded, the water injection device 25 does not inject water. For this reason, when water injection is not demanded, water injected from the water injection device 25 does not strike the protective layer 60 of the air-fuel ratio sensor 10. Further, after the temperature of the exhaust pipe 22 reaches the dew point temperature of water, new condensed water is not produced inside the exhaust passage, so the possibility of a large amount of drops of water striking the protective layer 60 is small.

For this reason, the heater control part 80a sets the target temperature of the sensor cell 51 to the first temperature when water injection by the water injection device 25 is not being demanded after a predetermined time elapses from the startup of the internal combustion engine 1. The predetermined time is, for example, the time required for the temperature of the exhaust pipe 22 to reach the dew point temperature of water due to warmup after the startup of the internal combustion engine 1. If the temperature of the exhaust pipe 22 reaches the boiling point of water, almost all of the condensed water inside the exhaust pipe 22 is vaporized. For this reason, the predetermined time may be the time required for the temperature of the exhaust pipe 22 to reach the boiling point of water due to warmup after startup of the internal combustion engine 1.

The first temperature is the operating temperature of the sensor cell 51 and is, for example, 600° C. to 650° C. which are the activation temperature of the sensor cell 51 or more. By such control, it is possible to suppress the increase in the power consumption of the heater 55 due to setting the target temperature of the sensor cell 51 excessively high.

On the other hand, if water injection by the water injection device 25 is demanded and water is injected from the water injection device 25, sometimes the injected water reaches the exhaust passage without going through combustion of the air-fuel mixture in the combustion chamber 5. In this case, part of the water injected from the water injection device 25 is liable to strike the protective layer 60 of the air-fuel ratio sensor 10 and cause the element of the air-fuel ratio sensor 10 to crack.

As shown in FIG. 4, if the amount of the drops of water striking the protective layer 60 is large, in order to cause the Leidenfrost phenomenon at the protective layer 60, it is necessary to raise the temperature of the protective layer 60. For this reason, the heater control part 80a sets the target temperature of the sensor cell 51 to a second temperature when, after the elapse of the above predetermined time from the startup of the internal combustion engine 1, the operating state of the internal combustion engine 1 is in a water outflow state where the water injected by the water injection device 25 reaches the exhaust passage without going through combustion of the air-fuel mixture in the combustion chamber 5. The second temperature is a temperature higher than the first temperature, that is, the operating temperature of the sensor cell 51 and is, for example, 750° C. to 850° C. By such control, it is possible to prevent water injected from the water injection device 25 from causing the element of the air-fuel ratio sensor 10 to crack.

If water is injected from the water injection device 25 to the inside of the intake passage when valve overlap between the intake valve 6 and the exhaust valve 8 occurs, the injected water reaches the exhaust passage without going through combustion of the air-fuel mixture in the combustion chamber 5. For this reason, the time when the operating state of the internal combustion engine 1 is the water outflow state is the time when water is being injected by the water injection device 25 and the amount of valve overlap is larger than a predetermined value which is zero or more. The predetermined value is for example zero. Further, when the amount of valve overlap is small, the amount of water reaching the exhaust passage is small, so the possibility that water coverage causes the element of the air-fuel ratio sensor 10 to crack is low. For this reason, the predetermined value may be made a value larger than zero.

Note that, the "valve overlap of the intake valve 6 and the exhaust valve 8" means that the opening time of the intake valve 6 and the opening time of the exhaust valve 8 are partially overlapping. At least one of the variable valve timing mechanism B and variable valve timing mechanism C can cause valve overlap and change the amount of valve overlap (that is, time during which intake valve 6 and exhaust valve 8 are both open). Specifically, the amount of valve overlap is changed by at least one of using the variable valve timing mechanism B to change the opening timing of the intake valve 6 and using the variable valve timing mechanism C to change the closing timing of the exhaust valve 8.

FIGS. 6A and 6B are views schematically showing examples of the opening times of the exhaust valve 8 and intake valve 6. In the example shown in FIG. 6A, the closing timing of the exhaust valve 8 and the opening timing of the intake valve 6 match at top dead center of the exhaust stroke and no valve overlap occurs. In the example shown in FIG. 6B, the opening time of the exhaust valve 8 and the opening time of the intake valve 6 overlap, and thus valve overlap occurs.

Note that the heater control part 80a may set the target temperature of the sensor cell 51 to a third temperature until the elapse of a predetermined time from the startup of the internal combustion engine 1. The third temperature is a temperature higher than the first temperature, that is, the operating temperature of the sensor cell 51 and is, for example, 750° C. to 850° C. The third temperature may be the same as the second temperature. By such control, it is possible to prevent the condensed water produced inside the exhaust passage right after the startup of the internal combustion engine 1 from causing the element of the air-fuel ratio sensor 10 to crack.

<Explanation of Control Using Time Chart>

Figure 7:
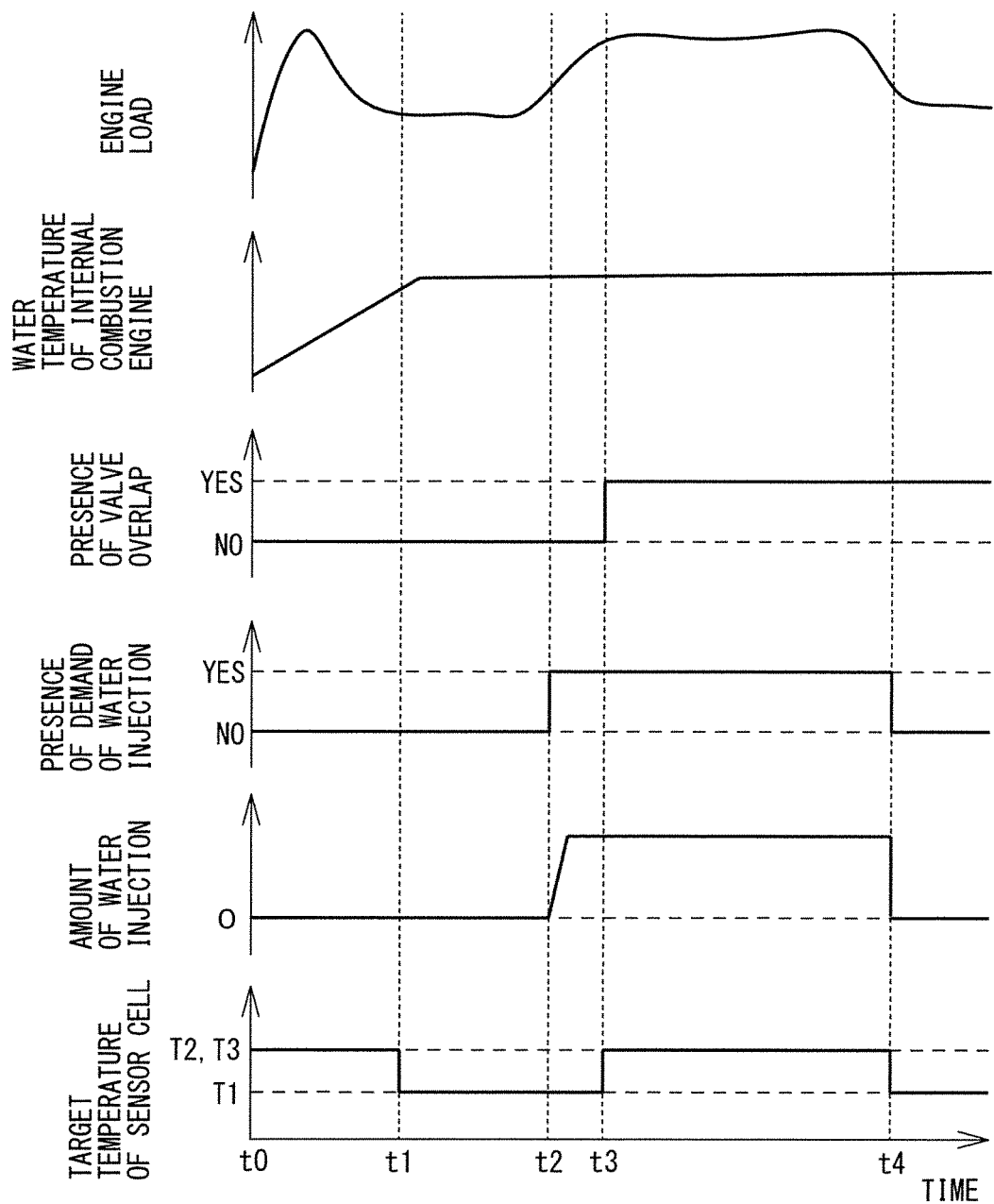
FIG. 7 is a schematic time chart of an engine load, etc., after making the internal combustion engine start up.

Below, referring to the time chart of FIG. 7, control of the internal combustion engine 1 will be specifically explained. FIG. 7 is a schematic time chart of the engine load, the water temperature of the internal combustion engine 1, the presence of valve overlap, the presence of demand for water injection, the amount of water injection, and the target temperature of the sensor cell 51 after starting up the internal combustion engine. Note that the water temperature of the internal combustion engine 1 is detected by a water temperature sensor arranged in the cooling water path of the internal combustion engine 1.

In the illustrated example, at the time t0, the internal combustion engine 1 is started up. If the internal combustion engine 1 is started up, the target temperature of the sensor cell 51 is set to a third temperature T3. The third temperature T3 is a temperature higher than the operating temperature of the sensor cell 51. In this example, it is 800° C.

At the time t1 when a predetermined time elapses from the startup of the internal combustion engine 1, the target temperature of the sensor cell 51 is switched from the third temperature T3 to the first temperature T1. The first temperature T1 is the operating temperature of the sensor cell 51. In this example, it is 600° C. Note that, at the time t1, water injection by the water injection device 25 is not demanded.

After the time t1, at the time t2, water injection by the water injection device 25 is demanded. As a result, water injection by the water injection device 25 is started and the amount of injection of water increases up to a predetermined value. At the time t2, the valve overlap is set to zero. For this reason, the target temperature of the sensor cell 51 is maintained at the first temperature T1.

After the time t2, at the time t3, valve overlap is caused. At this time, the demand for water injection is maintained. For this reason, in order to prevent the injected water from causing the element of the air-fuel ratio sensor 10 to crack, at the time t3, the target temperature of the sensor cell 51 is switched from the first temperature T1 to the second temperature T2. The second temperature T2 is a temperature higher than the operating temperature of the sensor cell 51. In this example, it is 800° C. In this example, the second temperature T2 is equal to the third temperature T3.

After the time t3, at the time t4, the demand for water injection is stopped. As a result, water injection by the water injection device 25 is stopped and the amount of injection of water becomes zero. For this reason, at the time t4, the target temperature of the sensor cell 51 is switched from the second temperature T2 to the first temperature T1.

<Processing for Setting Target Temperature>

Figure 8:
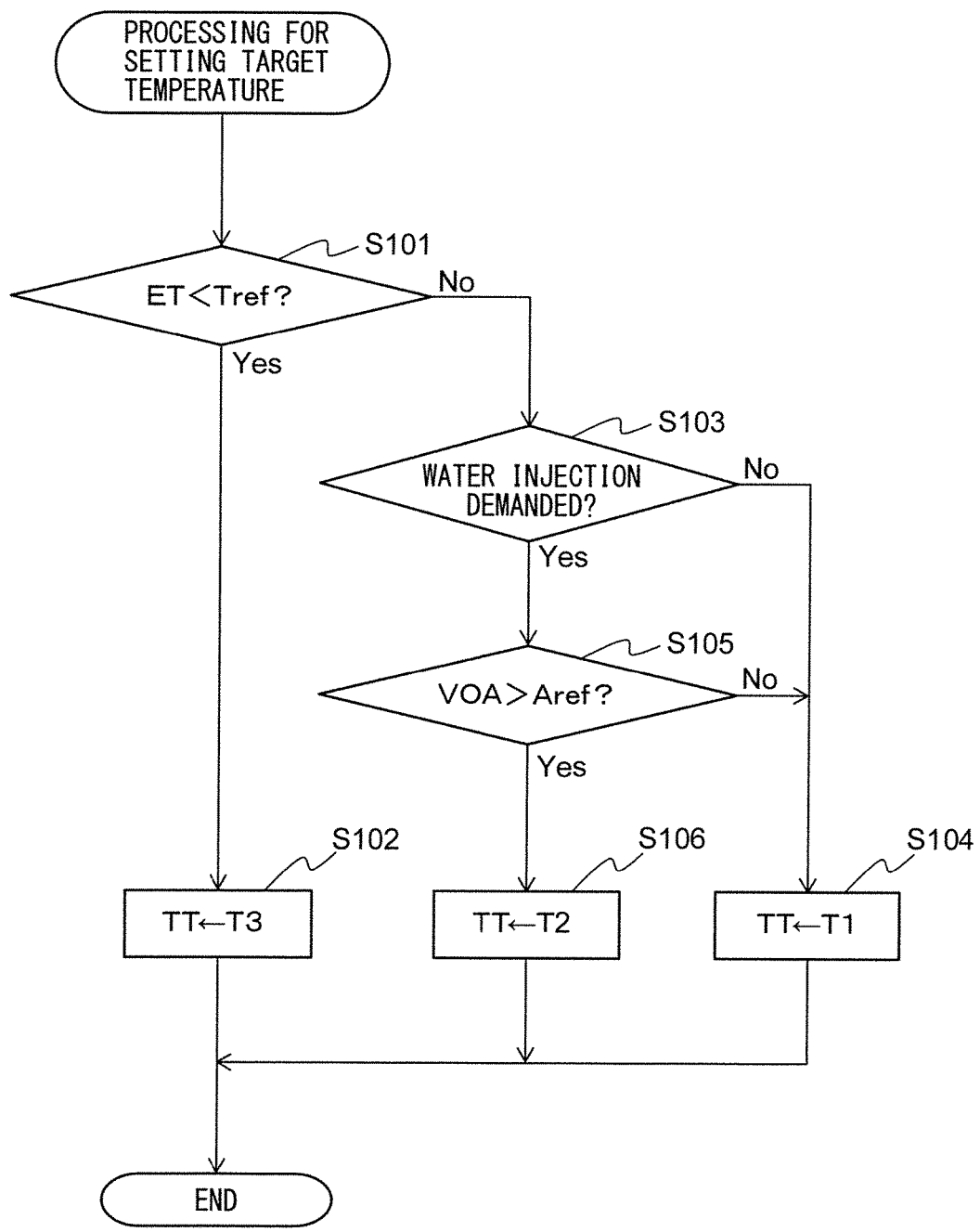
FIG. 8 is a flow chart showing a control routine of processing for setting the target temperature in the first embodiment of the present disclosure.

Below, referring to the flow chart of FIG. 8, control for setting the target temperature of the sensor cell 51 will be explained. FIG. 8 is a flow chart showing the control routine of processing for setting the target temperature in the first embodiment of the present disclosure. The present control routine is repeatedly performed by the ECU 80 at predetermined time intervals after the startup of the internal combustion engine 1.

First, at step S101, the heater control part 80a judges whether the elapsed time ET from when the internal combustion engine 1 started up is less than a predetermined time Tref. The predetermined time Tref is, for example, the time required for the temperature of the exhaust pipe 22 to reach the dew point temperature of water due to warmup after the startup of the internal combustion engine 1.

When at step S101 it is judged that the elapsed time ET is less than the predetermined time Tref, the present control routine proceeds to step S102. At step S102, the heater control part 80a sets the target temperature TT of the sensor cell 51 to a third temperature T3. The third temperature T3 is a temperature higher than the operating temperature of the sensor cell 51 and is, for example, 750° C. to 850° C. After step S102, the present control routine is ended.

On the other hand, when at step S101 it is judged that the elapsed time ET is the predetermined time Tref or more, the present control routine proceeds to step S103. At step S103, the heater control part 80a judges whether water injection by the water injection device 25 is being demanded.

When at step S103 it is judged that water injection by the water injection device 25 is not being demanded, the present control routine proceeds to step S104. At step S104, the heater control part 80a sets the target temperature TT to the first temperature T1. The first temperature T1 is the operating temperature of the sensor cell 51 and is, for example, 600° C. to 650° C. After step S104, the present control routine is ended.

On the other hand, when at step S103 it is judged that water injection by the water injection device 25 is being demanded, the present control routine proceeds to step S105. At step S105, the heater control part 80a judges whether the amount of valve overlap VOA of the intake valve 6 and the exhaust valve 8 is larger than a predetermined value Aref. The predetermined value Aref is a value of zero or more and is, for example, zero. The amount of valve overlap VOA is changed by at least one of the variable valve timing mechanism B and variable valve timing mechanism C.

When at step S105 it is judged that the amount of valve overlap VOA is the predetermined value Aref or less, the present control routine proceeds to step S104. At step S104, the heater control part 80a sets the target temperature TT to the first temperature T1. After step S104, the present control routine is ended.

On the other hand, when at step S105 it is judged that the amount of valve overlap VOA is larger than the predetermined value Aref, the present control routine proceeds to step S106. At step S106, the heater control part 80a sets the target temperature TT to a second temperature T2. The second temperature T2 is a temperature higher than the first temperature T1 and is, for example, 750° C. to 850° C. After step S106, the present control routine is ended.

In this regard, when the temperature of the protective layer 60 is a low temperature, compared with when the temperature of the protective layer 60 is a high temperature, the thermal shock given to the protective layer 60 and element body 50 when water evaporates inside the protective layer 60 becomes smaller. For this reason, the third temperature T3 at step S102 may be a temperature less than the lowest temperature where the Leidenfrost phenomenon occurs at the outer surface of the protective layer 60. The lowest temperature where the Leidenfrost phenomenon occurs at the outer surface of the protective layer 60 is for example 400° C., and the third temperature T3 is for example set to 300° C. Further, the heater control part 80a may turn the heater 55 off at step S102. By such control as well, it is possible to prevent condensed water generated inside the exhaust passage right after the startup of the internal combustion engine 1 from causing the element of the air-fuel ratio sensor 10 to crack.

<Second Embodiment>

The configuration and control of the control device of an internal combustion engine according to a second embodiment are basically similar to the configuration and control of the control device of an internal combustion engine according to the first embodiment except for the points explained below. For this reason, below, the second embodiment of the present disclosure will be explained centered on the parts different from the first embodiment.

Figure 9:
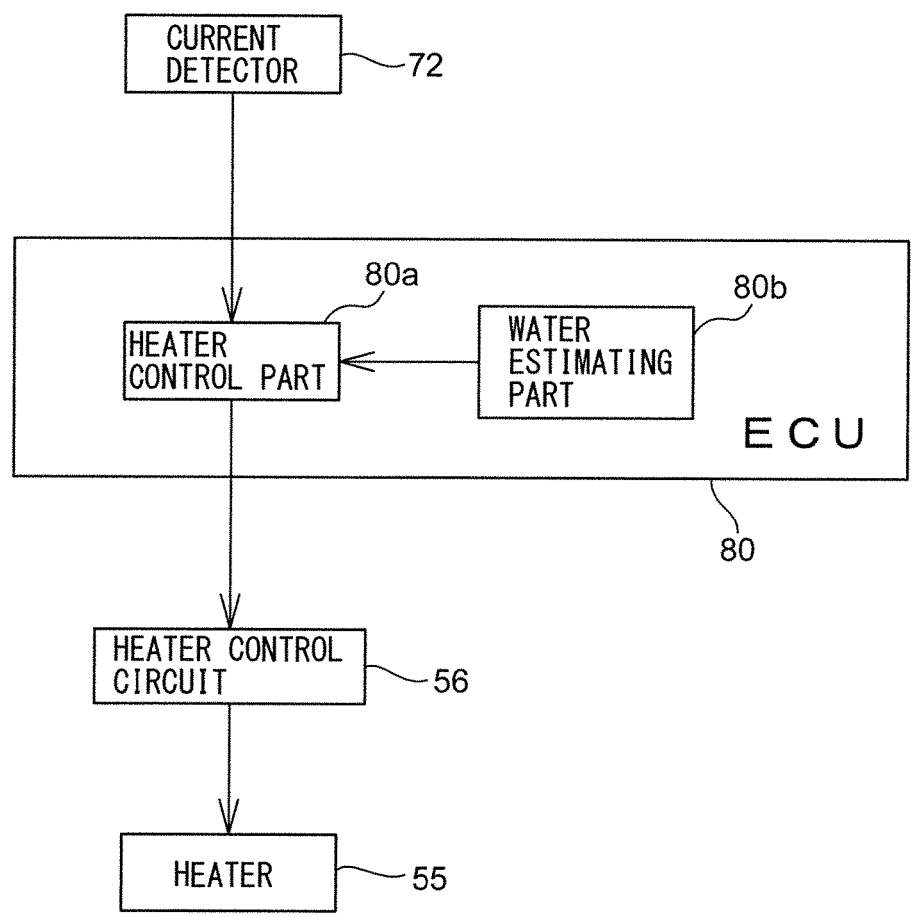
FIG. 9 is a block diagram schematically showing the configuration of a control device of an internal combustion engine according to a second embodiment of the present disclosure.

FIG. 9 is a block diagram schematically showing the configuration of a control device of an internal combustion engine according to the second embodiment of the present disclosure. The control device of the internal combustion engine 1 is further provided with the water estimating part 80b. The water estimating part 80b estimates the amount of water injected by the water injection device 25 and reaching the exhaust passage without going through combustion of the air-fuel mixture in the combustion chamber 5 (below, referred to as "the amount of outflowing water"). In the present embodiment, the water estimating part 80b is part of the ECU 80.

The water estimating part 80b, for example, estimates the amount of outflowing water based on the amount of water injected from the water injection device 25 per unit time. In this case, the greater the amount of water injected from the water injection device 25 per unit time, the greater the amount of outflowing water estimated by the water estimating part 80b. Further, the water estimating part 80b may estimate the amount of water outflow based on the amount of valve overlap. In this case, the larger the amount of valve overlap, the greater the amount of outflowing water estimated by the water estimating part 80b.

Figure 10:
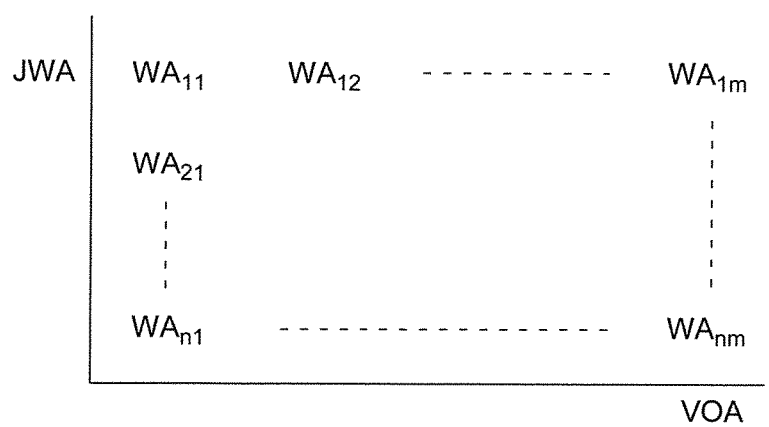
FIG. 10 is a map showing the relationship between an amount of water injected from the water injection device per unit time and an amount of valve overlap, and an amount of outflowing water.

Further, the water estimating part 80b may estimate the amount of outflowing water based on the amount of water injected from the water injection device 25 per unit time and the amount of valve overlap. In this case, the water estimating part 80b, for example, uses a map such as shown in FIG. 10 to estimate the amount of outflowing water. In this map, the amount of outflowing water WA is shown as a function of the amount of water JWA injected from the water injection device 25 per unit time and the amount of valve overlap VOA.

The greater the amount of outflowing water, the greater the amount of drops of water striking the protective layer 60. As will be understood from FIG. 4, the greater the amount of drops of water striking the protective layer 60, the higher the temperature of the protective layer 60 required for causing the Leidenfrost phenomenon. For this reason, in the second embodiment, the heater control part 80a sets the target temperature to the second temperature when the operating state of the internal combustion engine 1 is in the water outflow state, and if the amount of outflowing water estimated by the water estimating part 80b is relatively large, sets the second temperature higher compared with if the amount of outflowing water estimated by the water estimating part 80b is relatively small. In other words, the heater control part 80a sets the target temperature of the sensor cell 51 in stages (in steps) or linearly as the estimated amount of outflowing water becomes greater. Due to such control, in the second embodiment, it is possible to more effectively suppress an increase in the power consumption of the heater 55 while preventing water coverage from causing the element of the air-fuel ratio sensor 10 to crack.

<Processing for Setting Target Temperature>

Figure 11:
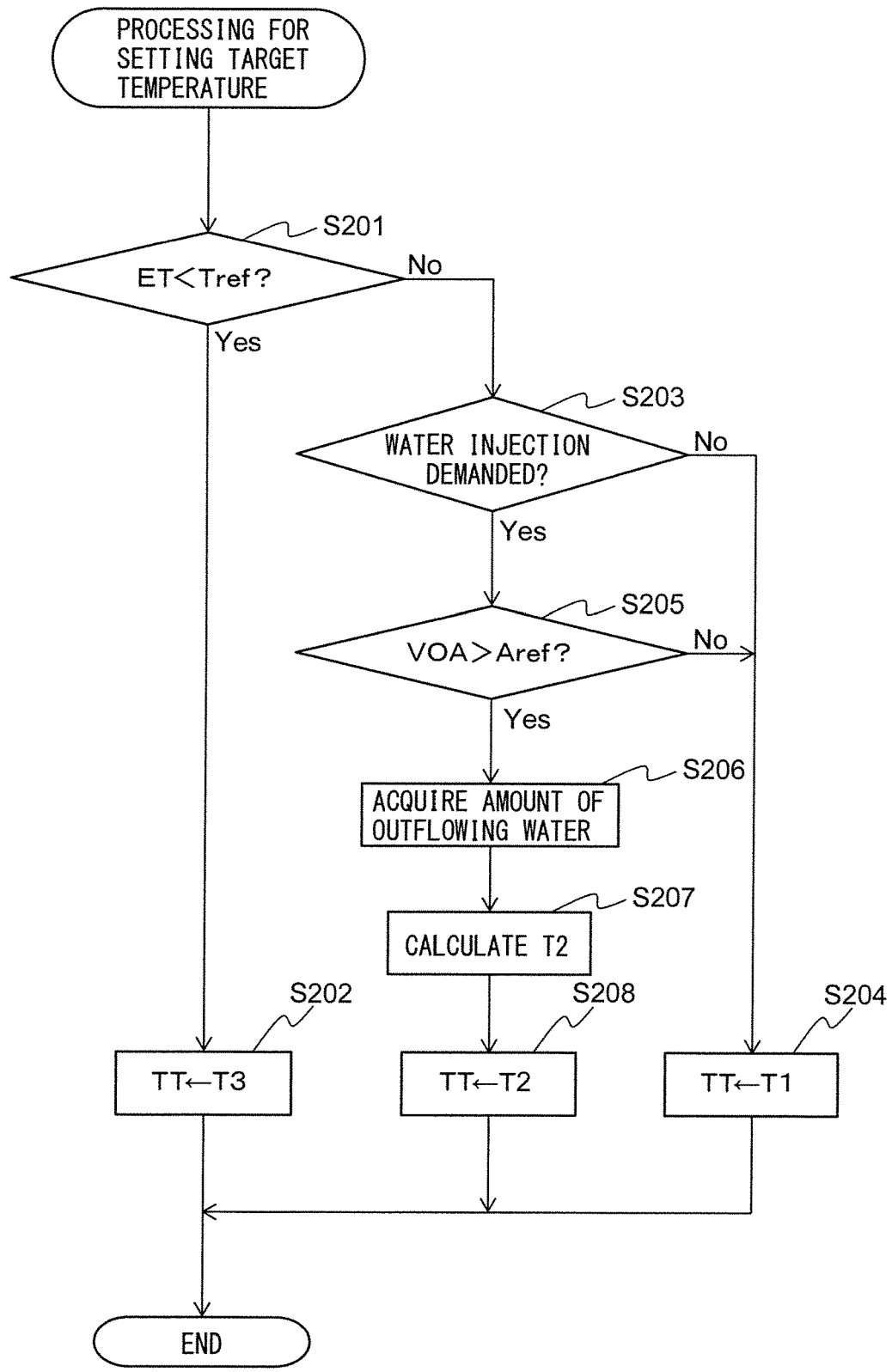
FIG. 11 is a flow chart showing the control routine of processing for setting the target temperature in a second embodiment of the present disclosure.

FIG. 11 is a flow chart showing the control routine of processing for setting the target temperature in the second embodiment of the present disclosure. The present control routine is repeatedly performed by the ECU 80 at predetermined time intervals after the startup of the internal combustion engine 1. Step S201 to step S205 in FIG. 11 are similar to step S101 to step S105 in FIG. 8, so explanations will be omitted.

The present control routine proceeds to step S206 when at step S205 it is judged that the amount of valve overlap VOA is larger than a predetermined value Aref. At step S206, the heater control part 80a obtains the amount of outflowing water estimated by the water estimating part 80b from the water estimating part 80b.

Figure 12:
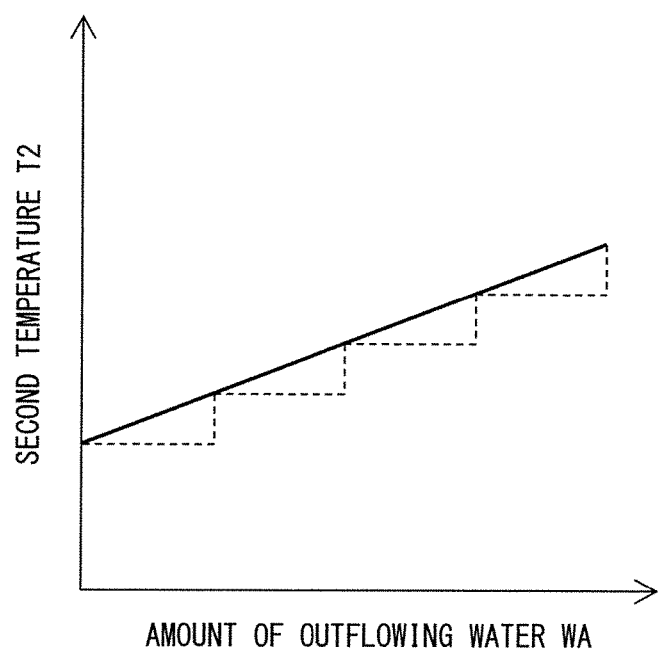
FIG. 12 is a map showing the relationship between an amount of outflowing water and a second temperature.

Next, at step S207, the heater control part 80*a* calculates the second temperature T2 based on the amount of outflowing water acquired at step S206. The heater control part 80*a* raises the second temperature T2 if the amount of outflowing water is relatively large compared with if the amount of outflowing water is relatively small. For example, the heater control part 80*a* uses a map such as shown in FIG. 12 to calculate the second temperature T2. In this map, the second temperature T2 is shown as a function of the amount of outflowing water WA. The lower limit of the second temperature T2 is set to a temperature higher than the first temperature T1. Note that, the second temperature T2 may be made higher in stages (in steps) as the amount of outflowing water WA becomes greater, as shown in FIG. 12 by the broken line.

Next, at step S208, the heater control part 80*a* sets the target temperature TT to the second temperature T2 calculated at step S207. After step S208, the present control routine is ended.

<Third Embodiment>

The configuration and control of the control device of an internal combustion engine according to a third embodiment are basically similar to the configuration and control of the control device of an internal combustion engine according to the first embodiment except for the points explained below. For this reason, below, the third embodiment of the present disclosure will be explained centered on the parts different from the first embodiment.

A certain extent of time is taken from when the target temperature of the sensor cell 51 is switched from the first temperature to the second temperature to when the actual temperature of the sensor cell 51 reaches the second temperature. For this reason, even if setting the target temperature of the sensor cell 51 to the second temperature when like in the first embodiment, the operating state of the internal combustion engine 1 is in the water outflow state, water injected from the water injection device 25 is liable to strike the protective layer 60 before the actual temperature of the sensor cell 51 reaches the second temperature.

For this reason, in the third embodiment, the heater control part 80*a* sets the target temperature of the sensor cell 51 to the second temperature when water is being injected from the water injection device 25. Due to this, it is possible to most reliably prevent water coverage from causing the element of the air-fuel ratio sensor 10 to crack.

<Explanation of Control Using Time Chart>

Figure 13:
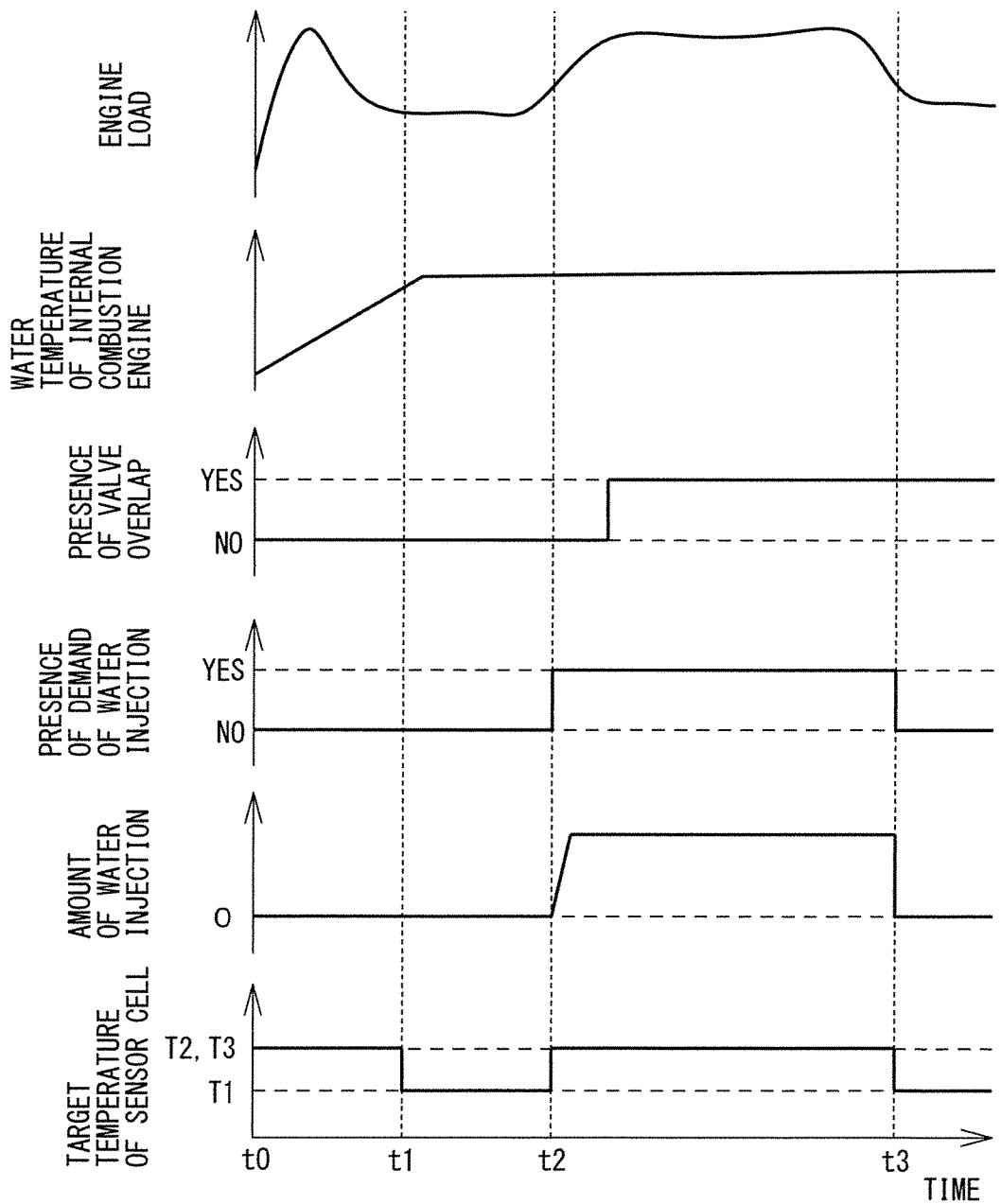
FIG. 13 is a schematic time chart of an engine load, etc., after starting up an internal combustion engine.

Below, referring to the time chart of FIG. 13, control of the internal combustion engine 1 in the third embodiment will be specifically explained. FIG. 13 is a schematic time chart of the engine load, the water temperature of the internal combustion engine 1, the presence of valve overlap, the presence of demand for water injection, the amount of water injection, and the target temperature of the sensor cell 51 after starting up the internal combustion engine 1.

In the illustrated example, at the time t0, the internal combustion engine 1 is started up. If the internal combustion engine 1 is started up, the target temperature of the sensor cell 51 is set to the third temperature T3. The third temperature T3 is a temperature higher than the operating temperature of the sensor cell 51 and in this example, is 800° C.

At the time t1 after the elapse of a predetermined time from the startup of the internal combustion engine 1, the target temperature of the sensor cell 51 is switched from the third temperature T3 to the first temperature T1. The first temperature T1 is the operating temperature of the sensor cell 51. In this example, it is 600° C. Note that, at the time t1, water injection by the water injection device 25 is not being demanded.

After the time t1, at the time t2, water injection by the water injection device 25 is demanded. As a result, water injection by the water injection device 25 is started. The amount of injection of water increases until a predetermined value. Further, at the time t2, the target temperature of the sensor cell 51 is switched from the first temperature T1 to a second temperature T2. The second temperature T2 is a temperature higher than the operating temperature of the sensor cell 51. In this example, it is 800° C. Note that, at the time t2, the amount of valve overlap is set to zero. For this reason, the temperature of the sensor cell 51 can be risen to the second temperature T2 before the operating state of the internal combustion engine 1 becomes the water outflow state.

After the time t2, at the time t3, the demand for water injection is stopped. As a result, water injection by the water injection device 25 is stopped and the amount of injection of water becomes zero. For this reason, at the time t3, the target temperature of the sensor cell 51 is switched from the second temperature T2 to the first temperature T1.

<Processing for Setting Target Temperature>

Figure 14:
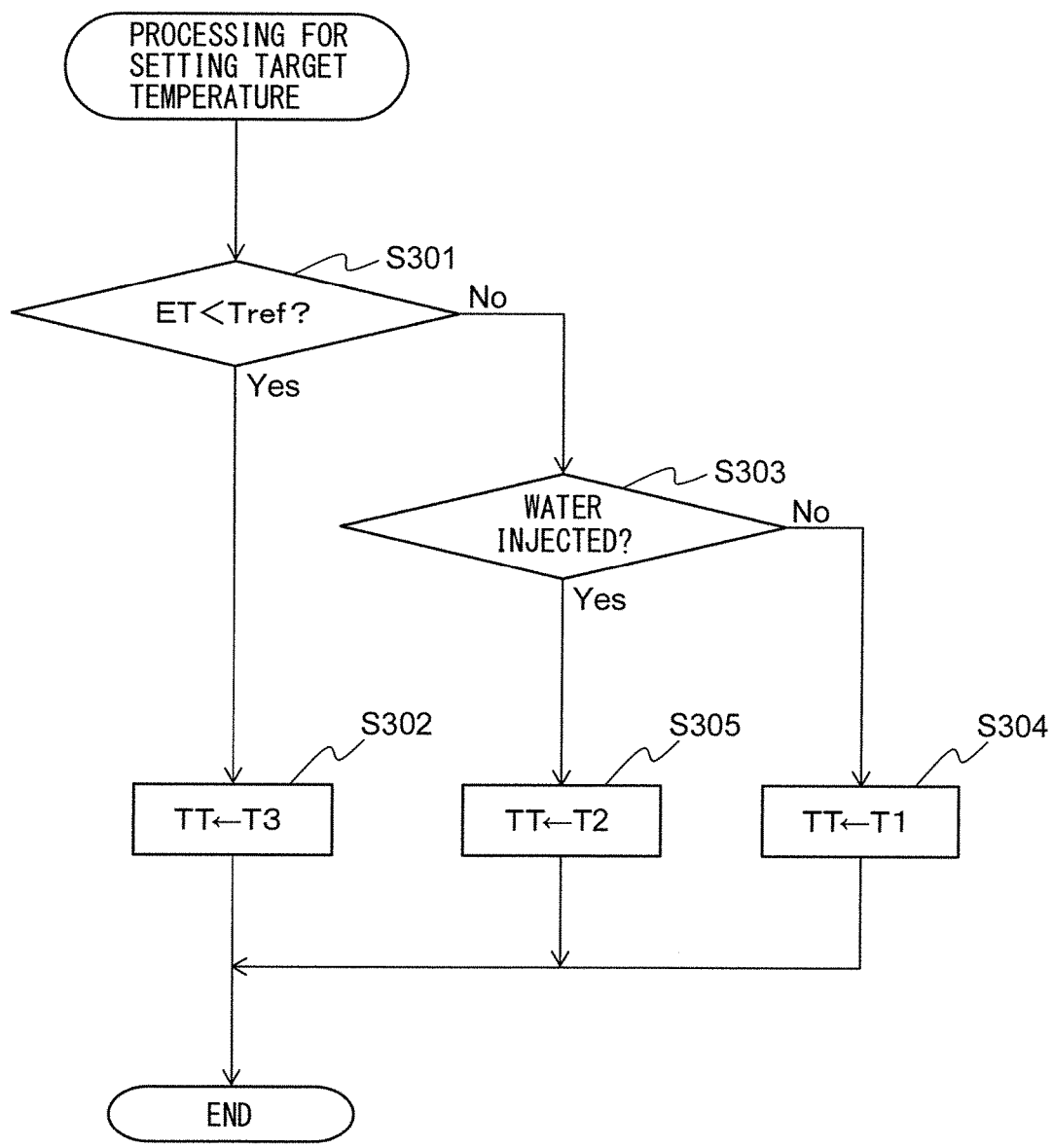
FIG. 14 is a flow chart showing the control routine of processing for setting the target temperature in a third embodiment of the present disclosure.

FIG. 14 is a flow chart showing the control routine of processing for setting the target temperature in the third embodiment of the present disclosure. The present control routine is repeatedly performed by the ECU 80 at predetermined time intervals after the startup of the internal combustion engine 1. Step S301 and step S302 in FIG. 14 are similar to step S101 and step S102 in FIG. 8, so explanations will be omitted.

The present control routine proceeds to step S303 when at step S301 it is judged that the elapsed time ET is a predetermined time Tref or more. At step S303, the heater control part 80*a* judges whether water is being injected from the water injection device 25.

When at step S303 it is judged that water is not being injected from the water injection device 25, the present control routine proceeds to step S304. At step S304, the heater control part 80*a* sets the target temperature TT to the first temperature T1. The first temperature T1 is the operating temperature of the sensor cell 51 and is, for example, 600° C. to 650° C. After step S304, the present control routine is ended.

On the other hand, when at step S303 it is judged that water is being injected from the water injection device 25, the present control routine proceeds to step S305. At step S305, the heater control part 80*a* sets the target temperature TT to the second temperature T2. The second temperature T2 is a temperature higher than the first temperature T1 and is, for example, 750° C. to 850° C. After step S305, the present control routine is ended.

<Fourth Embodiment>

The configuration and control of the control device of an internal combustion engine according to a fourth embodiment are basically similar to the configuration and control of the control device of an internal combustion engine according to the first embodiment except for the points explained below. For this reason, below, the fourth embodiment of the present disclosure will be explained centered on the parts different from the first embodiment.

Figure 15:
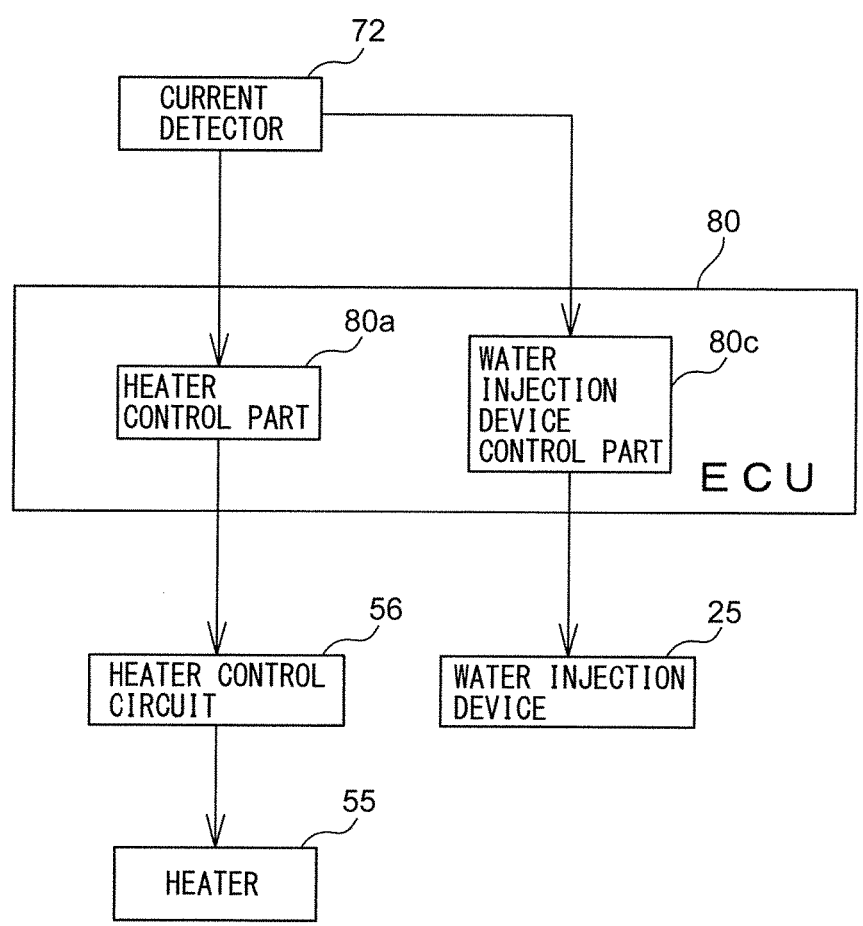
FIG. 15 is a block diagram schematically showing the configuration of a control device of an internal combustion engine according to a fourth embodiment of the present disclosure.

FIG. 15 is a block diagram schematically showing the configuration of a control device of an internal combustion engine according to the fourth embodiment of the present disclosure. The control device of the internal combustion engine 1 is further provided with a water injection device control part 80c. The water injection device control part 80c controls the water injection device 25. In the present embodiment, the water injection device control part 80c is part of the ECU 80.

When water injection by the water injection device 25 is demanded, sometimes the amount of valve overlap is set to a value of a predetermined value or more. For this reason, even if setting the target temperature of the sensor cell 51 to the second temperature when like in the third embodiment, the water injection device 25 is injecting water, the water injected from the water injection device 25 is liable to strike the protective layer 60 before the actual temperature of the sensor cell 51 reaches the second temperature.

For this reason, in the fourth embodiment, the heater control part 80a sets the target temperature of the sensor cell 51 to the second temperature when water injection by the water injection device 25 is demanded. Further, after the estimated temperature of the sensor cell 51 reaches the second temperature, the water injection device control part 80c starts water injection by the water injection device 25. Due to this, it is possible to most reliably prevent water coverage from causing the element of the air-fuel ratio sensor 10 to crack.

<Explanation of Control Using Time Chart>

Figure 16:
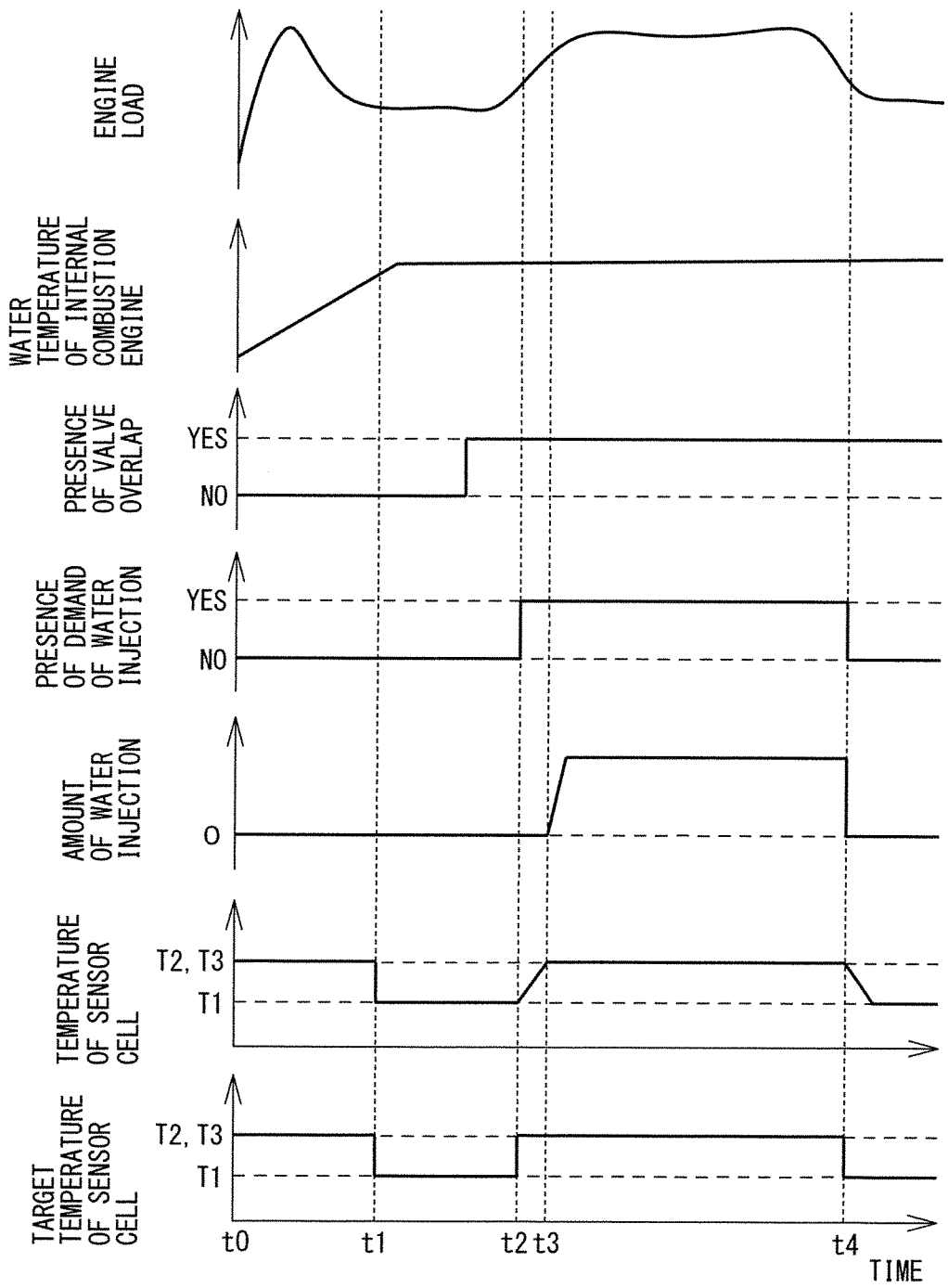
FIG. 16 is a schematic time chart of an engine load, etc., after starting up an internal combustion engine etc.

Below, referring to the time chart of FIG. 16, control of the internal combustion engine 1 in the fourth embodiment will be specifically explained. FIG. 16 is a schematic time chart of the engine load, the water temperature of the internal combustion engine 1, the presence of valve overlap, the presence of demand for water injection, the amount of water injection, the temperature of the sensor cell 51, and the target temperature of the sensor cell 51 after starting up the internal combustion engine. Note that the temperature of the sensor cell 51 is calculated from the impedance of the sensor cell 51.

In the illustrated example, at the time t0, the internal combustion engine 1 is started up. If the internal combustion engine 1 is started up, the target temperature of the sensor cell 51 is set to the third temperature T3. The third temperature T3 is a temperature higher than the operating temperature of the sensor cell 51 and in this example, is 800° C.

At the time t1 after the elapse of a predetermined time from the startup of the internal combustion engine 1, the target temperature of the sensor cell 51 is switched from the third temperature T3 to the first temperature T1. The first temperature T1 is the operating temperature of the sensor cell 51. In this example, it is 600° C. Note that, at the time t1, water injection by the water injection device 25 is not being demanded.

After the time t1, at the time t2, water injection by the water injection device 25 is demanded. For this reason, at the time t2, the target temperature of the sensor cell 51 is switched from the first temperature T1 to a second temperature T2. The second temperature T2 is a temperature higher than the operating temperature of the sensor cell 51. In this example, it is 800° C.

In the illustrated example, valve overlap is caused between the time t1 and the time t2. In this case, if at the time t2 water injection by the water injection device 25 is started, the injected water is liable to strike the protective layer 60 before the temperature of the sensor cell 51 reaches the second temperature T2. For this reason, at the time t3, the temperature of the sensor cell 51 reaches the second temperature T2, then water injection by the water injection device 25 is started.

After the time t3, at the time t4, the demand for water injection is stopped. As a result, injection of water by the water injection device 25 is stopped and the amount of injection of water becomes zero. For this reason, at the time t4, the target temperature of the sensor cell 51 is switched from the second temperature T2 to the first temperature T1.

<Processing for Setting Target Temperature>

Figure 17:
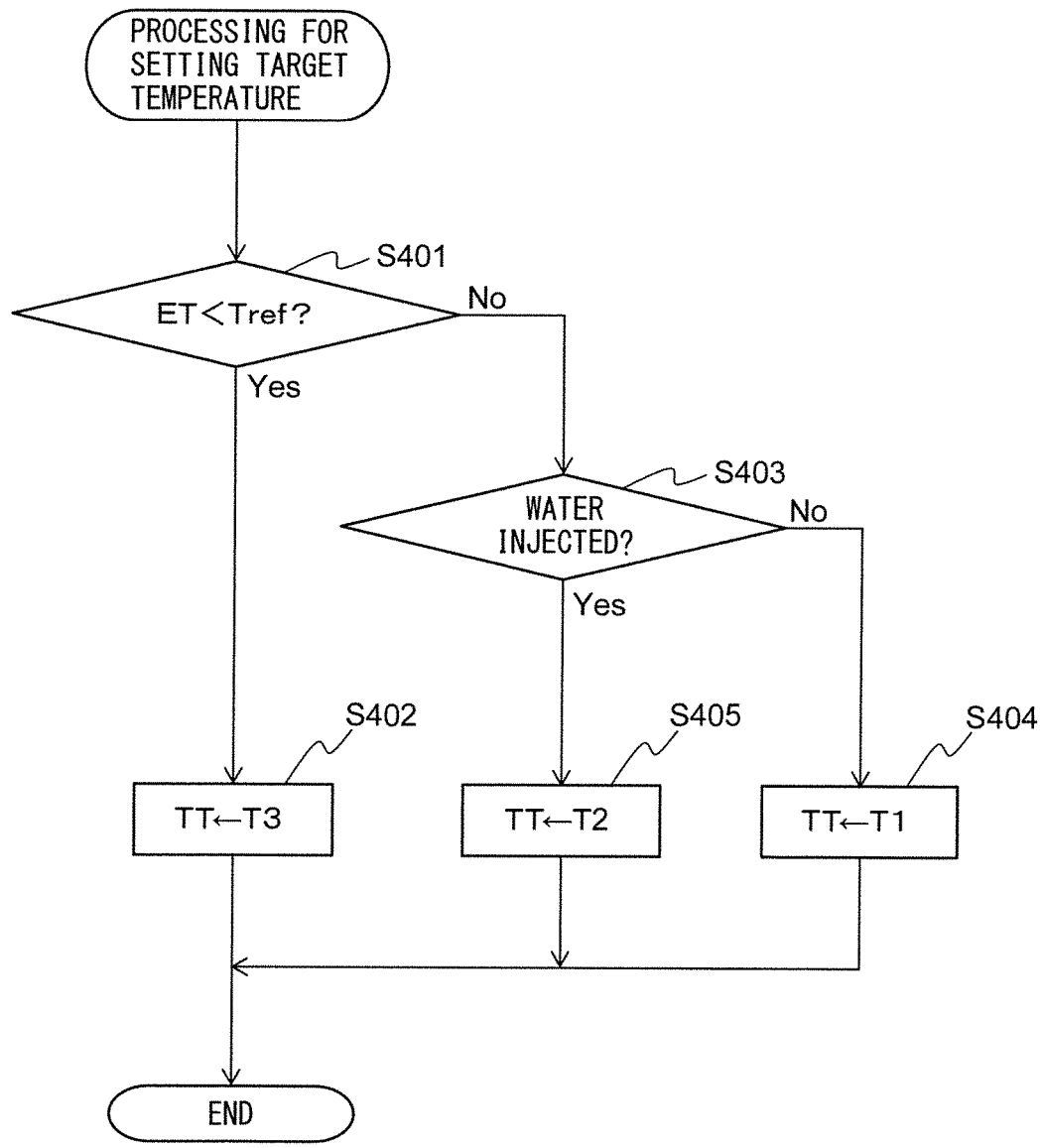
FIG. 17 is a flow chart showing the control routine of processing for setting the target temperature in the fourth embodiment of the present disclosure.

FIG. 17 is a flow chart showing the control routine of processing for setting the target temperature in the fourth embodiment of the present disclosure. The present control routine is repeatedly performed by the ECU 80 at predetermined time intervals after the startup of the internal combustion engine 1. Step S401 to step S404 in FIG. 17 are similar to step S101 to step S104 in FIG. 8, so explanations will be omitted.

When at step S403 it is judged that water injection by the water injection device 25 is being demanded, the present control routine proceeds to step S405. At step S405, the heater control part 80a sets the target temperature TT to the second temperature T2. The second temperature T2 is a temperature higher than the first temperature T1 and is, for example, 750° C. to 850° C. After step S405, the present control routine is ended.

<Processing for Water Injection>

Figure 18:
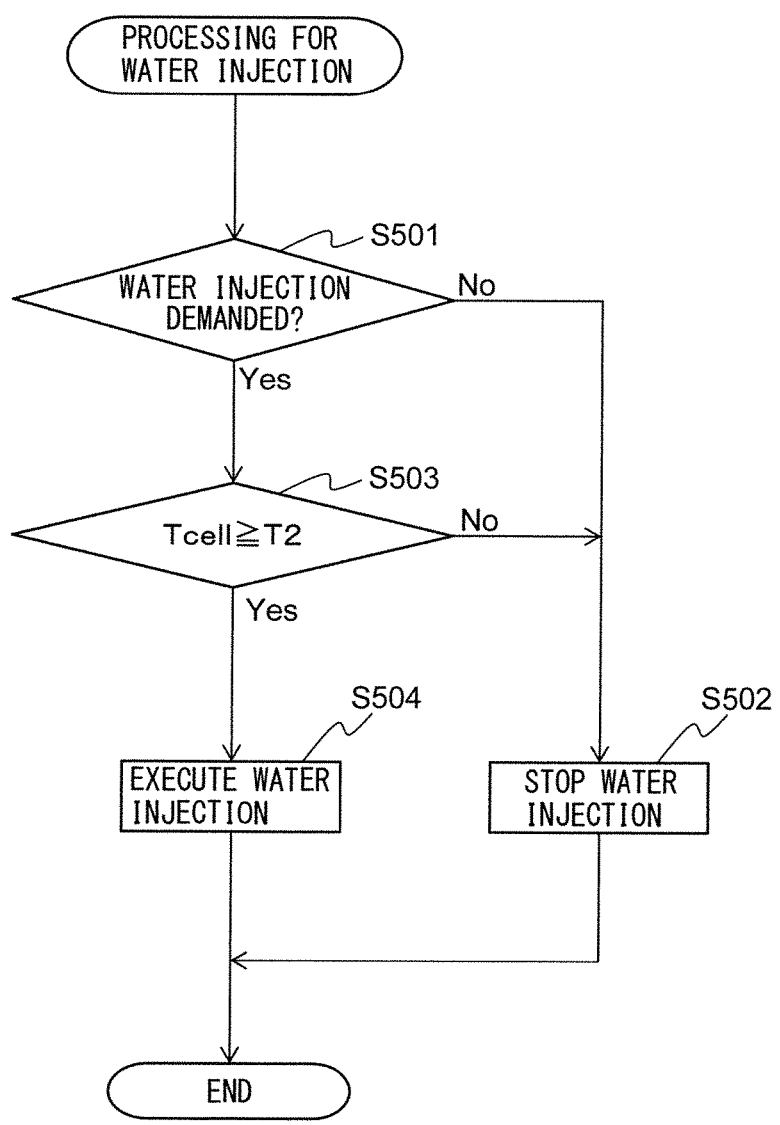
FIG. 18 is a flow chart showing the control routine of processing for setting water injection in a fourth embodiment of the present disclosure.

Below, referring to the flow chart of FIG. 18, control of water injection by the water injection device 25 will be explained. FIG. 18 is a flow chart showing a control routine of processing for water injection in the fourth embodiment of the present disclosure. The present control routine is repeatedly performed by the ECU 80 at predetermined time intervals after the startup of the internal combustion engine 1.

First, at step S501, the water injection device control part 80c judges whether water injection by the water injection device 25 is being demanded. Water injection by the water injection device 25 is, for example, demanded when the engine load of the internal combustion engine 1 becomes a predetermined value or more.

When at step S501 it is judged that water injection by the water injection device 25 is not being demanded, the present control routine proceeds to step S502. At step S502, the water injection device control part 80c does not perform water injection by the water injection device 25. After step S502, the present control routine is ended.

On the other hand, when at step S501 it is judged that water injection by the water injection device 25 is being demanded, the present control routine proceeds to step S503. At step S503, the water injection device control part 80c judges whether the temperature Tcell of the sensor cell 51 is the second temperature T2 or more. The temperature Tcell of the sensor cell 51 is for example calculated from the impedance of the sensor cell 51. The second temperature T2 is the target temperature of the sensor cell 51 set at step S405 of FIG. 17.

When at step S503 it is judged that the temperature Tcell of the sensor cell 51 is less than the second temperature T2, the present control routine proceeds to step S502. In this case, at step S405 of FIG. 17, after the target temperature TT of the sensor cell 51 is set to the second temperature T2, the temperature Tcell of the sensor cell 51 still does not reach the second temperature T2. For this reason, at step S502, the water injection device control part 80c does not perform water injection by the water injection device 25. After step S502, the present control routine is ended.

On the other hand, when at step S503 it is judged that the temperature Tcell of the sensor cell 51 is the second temperature T2 or more, the present control routine proceeds to step S504. At step S504, the water injection device control part 80c performs water injection by the water injection device 25. After step S504, the present control routine is ended.

<Other Embodiments>

Above, embodiments according to the present disclosure were explained, but the present disclosure is not limited to these embodiments and can be corrected and changed in various ways within the scope of the claims.

For example, the water injection device 25 may inject water into the combustion chamber 5 so as to lower the temperature of the combustion chamber 5. In this case, the water injection device 25 is for example fastened to the cylinder head 4. Further, if water is injected from the water injection device 25 to the inside of the combustion chamber 5 while the exhaust valve 8 is open, the injected water reaches the exhaust passage without going through combustion of the air-fuel mixture in the combustion chamber 5. For this reason, when the water injection device 25 injects water into the combustion chamber 5, the time when the operating state of the internal combustion engine is in the water outflow state is the time when water is being injected by water injection device 25 while the exhaust valve 8 is opened.

The exhaust sensor provided at the internal combustion engine may be an oxygen sensor detecting if the air-fuel ratio of the exhaust gas is rich or lean. Further, the exhaust sensor may be a nitrogen oxide sensor ($NO_X$ sensor) detecting the concentration of nitrogen oxides ($NO_X$) in the exhaust gas, a sulfur oxide sensor ($SO_X$ sensor) detecting the concentration of sulfur oxides ($SO_X$) in the exhaust gas, etc.

Further, the element body of the exhaust sensor may be provided with another electrochemical cell in addition to the sensor cell. The other electrochemical cell is, for example, a pump cell discharging the oxygen in the measured gas from the measured gas chamber, a monitor cell detecting the concentration of a specific component in the measured gas, etc. In this case, the heater control part may set the target temperature of the pump cell or monitor cell and control the heater so that the temperature of the pump cell or monitor cell becomes the target temperature. For example, the temperature of the pump cell or monitor cell is calculated from its impedance.

1. internal combustion engine
10. air-fuel ratio sensor
12. sensor element
50. element body
51. sensor cell
55. heater
60. protective layer
80. electronic control unit (ECU)
80a. heater control part
80b. water estimating part
80d. water injection device control part

The invention claimed is:

1. A control device of an internal combustion engine controlling an internal combustion engine comprising an exhaust sensor arranged in an exhaust passage and detecting a specific component in exhaust gas, and a water injection device injecting water inside an intake passage or inside a combustion chamber, wherein the exhaust sensor comprises an element body provided with an electrochemical cell, a protective layer formed on an outer surface of the element body and comprised of a porous ceramic, and a heater heating the element body and the protective layer, the control device comprises a heater control part configured to set a target temperature of the electrochemical cell and control the heater so that a temperature of the electrochemical cell becomes the target temperature and the heater control part is configured to set the target temperature to a first temperature when water injection by the water injection device is not being demanded after a predetermined time elapses from startup of the internal combustion engine, and set the target temperature to a second temperature when an operating state of the internal combustion engine is in a water outflow state where water injected by the water injection device reaches the exhaust passage without going through combustion of air-fuel mixture in the combustion chamber, the second temperature being higher than the first temperature.

2. The control device of an internal combustion engine according to claim 1, wherein the internal combustion engine comprises a variable valve timing mechanism able to change an amount of valve overlap between an intake valve and an exhaust valve, the water injection device injects water into the intake passage, and the time when the operating state of the internal combustion engine is in the water outflow state is the time when water is being injected by the water injection device and the amount of valve overlap is larger than a predetermined value which is zero or more.

3. The control device of an internal combustion engine according to claim 1, wherein the water injection device injects water into the combustion chamber, and the time when the operating state of the internal combustion engine is in the water outflow state is the time when water is being injected by the water injection device while the exhaust valve is opened.

4. The control device of an internal combustion engine according to claim 1, further comprising a water estimating part configured to estimate an amount of water injected by the water injection device and reaching the exhaust passage without going through combustion of the air-fuel mixture in the combustion chamber, wherein the heater control part is configured to set the second temperature higher when the amount of water estimated by the water estimating part is large compared to when the amount of water estimated by the water estimating part is small.

5. The control device of an internal combustion engine according to claim 2, further comprising a water estimating part configured to estimate an amount of water injected by the water injection device and reaching the exhaust passage without going through combustion of the air-fuel mixture in the combustion chamber, wherein the heater control part is configured to set the second temperature higher when the amount of water estimated by the water estimating part is large compared to when the amount of water estimated by the water estimating part is small.

6. The control device of an internal combustion engine according to claim 3, further comprising a water estimating part configured to estimate an amount of water injected by the water injection device and reaching the exhaust passage without going through combustion of the air-fuel mixture in the combustion chamber, wherein the heater control part is configured to set the second temperature higher when the amount of water estimated by the water estimating part is large compared to when the amount of water estimated by the water estimating part is small.

7. The control device of an internal combustion engine according to claim 1, wherein the heater control part is configured to set the target temperature to the second temperature when water is being injected by the water injection device.

8. The control device of an internal combustion engine according to claim 2, wherein the heater control part is configured to set the target temperature to the second temperature when water is being injected by the water injection device.

9. The control device of an internal combustion engine according to claim 3, wherein the heater control part is configured to set the target temperature to the second temperature when water is being injected by the water injection device.

10. The control device of an internal combustion engine according to claim 4, wherein the heater control part is configured to set the target temperature to the second temperature when water is being injected by the water injection device.

11. The control device of an internal combustion engine according to claim 5, wherein the heater control part is configured to set the target temperature to the second temperature when water is being injected by the water injection device.

12. The control device of an internal combustion engine according to claim 6, wherein the heater control part is configured to set the target temperature to the second temperature when water is being injected by the water injection device.

13. The control device of an internal combustion engine according to claim 7, further comprising a water injection device control part configured to control the water injection device,
the heater control part is configured to set the target temperature to the second temperature when injection of water by the water injection device is demanded, wherein
the water injection device control part is configured to start injection of water by the water injection device after an estimated temperature of the electrochemical cell reaches the second temperature.

14. The control device of an internal combustion engine according to claim 8, further comprising a water injection device control part configured to control the water injection device,
the heater control part is configured to set the target temperature to the second temperature when injection of water by the water injection device is demanded, wherein
the water injection device control part is configured to start injection of water by the water injection device after an estimated temperature of the electrochemical cell reaches the second temperature.

15. The control device of an internal combustion engine according to claim 9, further comprising a water injection device control part configured to control the water injection device,
the heater control part is configured to set the target temperature to the second temperature when injection of water by the water injection device is demanded, wherein
the water injection device control part is configured to start injection of water by the water injection device after an estimated temperature of the electrochemical cell reaches the second temperature.

16. The control device of an internal combustion engine according to claim 10, further comprising a water injection device control part configured to control the water injection device,
the heater control part is configured to set the target temperature to the second temperature when injection of water by the water injection device is demanded, wherein
the water injection device control part is configured to start injection of water by the water injection device after an estimated temperature of the electrochemical cell reaches the second temperature.

17. The control device of an internal combustion engine according to claim 11, further comprising a water injection device control part configured to control the water injection device,
the heater control part is configured to set the target temperature to the second temperature when injection of water by the water injection device is demanded, wherein
the water injection device control part is configured to start injection of water by the water injection device after an estimated temperature of the electrochemical cell reaches the second temperature.

18. The control device of an internal combustion engine according to claim 12, further comprising a water injection device control part configured to control the water injection device,
the heater control part is configured to set the target temperature to the second temperature when injection of water by the water injection device is demanded, wherein
the water injection device control part is configured to start injection of water by the water injection device after an estimated temperature of the electrochemical cell reaches the second temperature.

* * * * *

UNITED STATES PATENT AND TRADEMARK OFFICE
CERTIFICATE OF CORRECTION

PATENT NO. : 10,428,768 B2
APPLICATION NO. : 15/609927
DATED : October 1, 2019
INVENTOR(S) : Go Hayashita Page 1 of 1

It is certified that error appears in the above-identified patent and that said Letters Patent is hereby corrected as shown below:

On the Title Page

Item (72), Inventor, after "Chigasaki" insert -- -shi--.

In the Specification

In Column 3, Line 21, delete "forth" and insert --fourth--, therefor.

Signed and Sealed this
Tenth Day of December, 2019

Andrei Iancu
*Director of the United States Patent and Trademark Office*